(12) United States Patent
Isshiki

(10) Patent No.: US 8,270,717 B2
(45) Date of Patent: Sep. 18, 2012

(54) METADATA DETERMINATION METHOD AND IMAGE FORMING APPARATUS

(75) Inventor: Naohiro Isshiki, Kawasaki (JP)

(73) Assignee: Canon Kabushiki Kaisha (JP)

( * ) Notice: Subject to any disclaimer, the term of this patent is extended or adjusted under 35 U.S.C. 154(b) by 883 days.

(21) Appl. No.: 12/336,692

(22) Filed: Dec. 17, 2008

(65) Prior Publication Data

US 2009/0161955 A1 Jun. 25, 2009

(30) Foreign Application Priority Data

Dec. 19, 2007 (JP) ................................. 2007-327984
Dec. 4, 2008 (JP) ................................. 2008-309998

(51) Int. Cl.
*G06K 9/34* (2006.01)
(52) U.S. Cl. ...................................................... 382/177
(58) Field of Classification Search ........................ None
See application file for complete search history.

(56) References Cited

U.S. PATENT DOCUMENTS

| | | | |
|---|---|---|---|
| 5,907,835 A | 5/1999 | Yokomizo et al. | |
| 6,535,293 B1 * | 3/2003 | Mitsuhashi | 358/1.13 |
| 6,611,347 B1 * | 8/2003 | Okada et al. | 358/1.15 |
| 7,054,029 B1 * | 5/2006 | Ohta et al. | 358/1.18 |
| 7,142,717 B2 * | 11/2006 | Matsukubo et al. | 382/190 |
| 7,692,834 B2 * | 4/2010 | Matsuzaki | 358/528 |
| 7,848,572 B2 * | 12/2010 | Misawa | 382/176 |
| 7,869,075 B2 * | 1/2011 | Matsui | 358/1.15 |
| 2004/0179717 A1 * | 9/2004 | Furukawa et al. | 382/112 |
| 2006/0029293 A1 * | 2/2006 | Matsuzaki | 382/298 |
| 2006/0050312 A1 * | 3/2006 | Takiyama et al. | 358/1.15 |
| 2006/0171588 A1 * | 8/2006 | Chellapilla et al. | 382/185 |
| 2006/0239556 A1 * | 10/2006 | Misawa | 382/176 |
| 2007/0229888 A1 * | 10/2007 | Matsui | 358/1.15 |

FOREIGN PATENT DOCUMENTS

| | | |
|---|---|---|
| JP | 8-147446 A | 6/1996 |
| JP | 2004-215067 A | 7/2004 |

* cited by examiner

*Primary Examiner* — Samir Ahmed
(74) *Attorney, Agent, or Firm* — Rossi, Kimms & McDowell LLP

(57) ABSTRACT

A method for extracting a character string from print data rasterizes the print data into a raster image. Then, the method divides the raster image into a character region and non-character region and determines character data used for metadata based on the raster image of the character region and character data extracted from the print data and drawn at approximately the same position as the character region.

13 Claims, 18 Drawing Sheets

(7.5, 9.0) - (15.4, 16.9)    (30.2, 11) - (37.1, 16.9)

```
<Strings String-Bbox="7.5, 9.0, 37.1, 16.9" Strings-text="Hello" Strings-ID=1>
  <Char>
    <Bbox> 7.5, 9.0, 15.4, 16.9
    <Text> H
  </Char>
  <Char>
    <Bbox> 16.9, 11.0, 23.4, 16.9
    <Text> e
  </Char>
  <Char>
    <Bbox> 24.4, 9.0, 25.9, 16.9
    <Text> l
  </Char>
  <Char>
    <Bbox> 27.6, 9.0, 29.1, 16.9
    <Text> l
  </Char>
  <Char>
    <Bbox> 30.2, 11.0, 37.1, 16.9
    <Text> o
  </Char>
</Strings>
```

FIG. 9

```
<Strings String-Bbox="7.5, 9.0, 15.4, 16.9" Strings-text="H" Strings-ID=1>
  <Char>
    <Bbox> 7.5, 9.0, 15.4, 16.9
    <Text> H
  </Char>
</Strings>

<Strings String-Bbox="30.2, 11.0, 37.1, 16.9" Strings-text="o" Strings-ID=2>
  <Char>
    <Bbox> 30.2, 11.0, 37.1, 16.9
    <Text> o
  </Char>
</Strings>

<Strings String-Bbox="16.9, 11.0, 23.4, 16.9" Strings-text="e" Strings-ID=3>
  <Char>
    <Bbox> 16.9, 11.0, 23.4, 16.9
    <Text> e
  </Char>
</Strings>

<Strings String-Bbox="24.4, 9.0, 25.9, 16.9" Strings-text="l" Strings-ID=4>
  <Char>
    <Bbox> 24.4, 9.0, 25.9, 16.9
    <Text> l
  </Char>
</Strings>

<Strings String-Bbox="27.6, 9.0, 29.1, 16.9" Strings-text="l" Strings-ID=5>
  <Char>
    <Bbox> 27.6, 9.0, 29.1, 16.9
    <Text> l
  </Char>
</Strings>
```

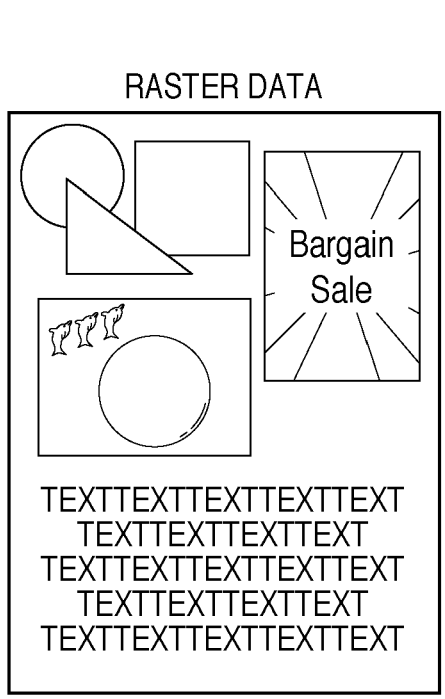
F I G. 13A
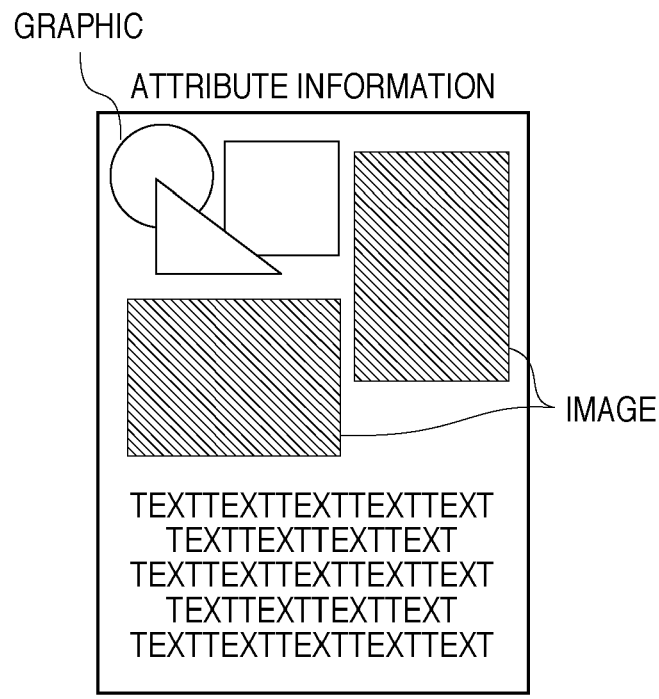
F I G. 13B
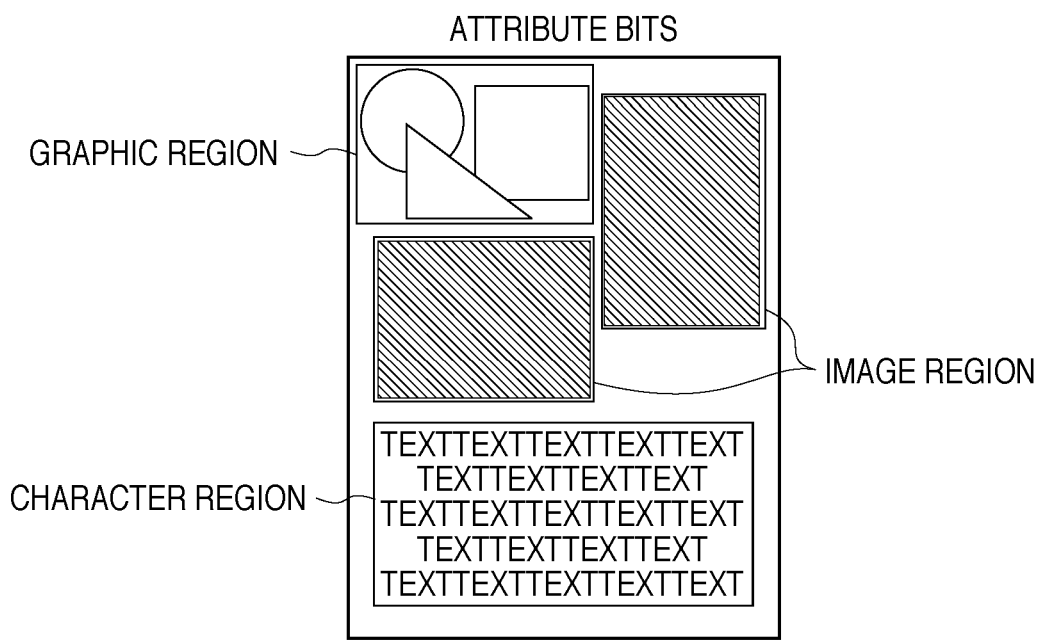
F I G. 13C

FIG. 14

```
<Metadata>
  <Kind> PDL
  <PageNo> 1
  <Date> 2006/1/1 00:00:00
  <User> AAA
  <Color> BW
  <Application> MEMO
  <From> 192.168.1.0
  <TEXT>
  It rained yesterday.
  </TEXT>
  <TEXT>
   It will be fine today.
  </TEXT>
</Metadata>
```

F I G. 15
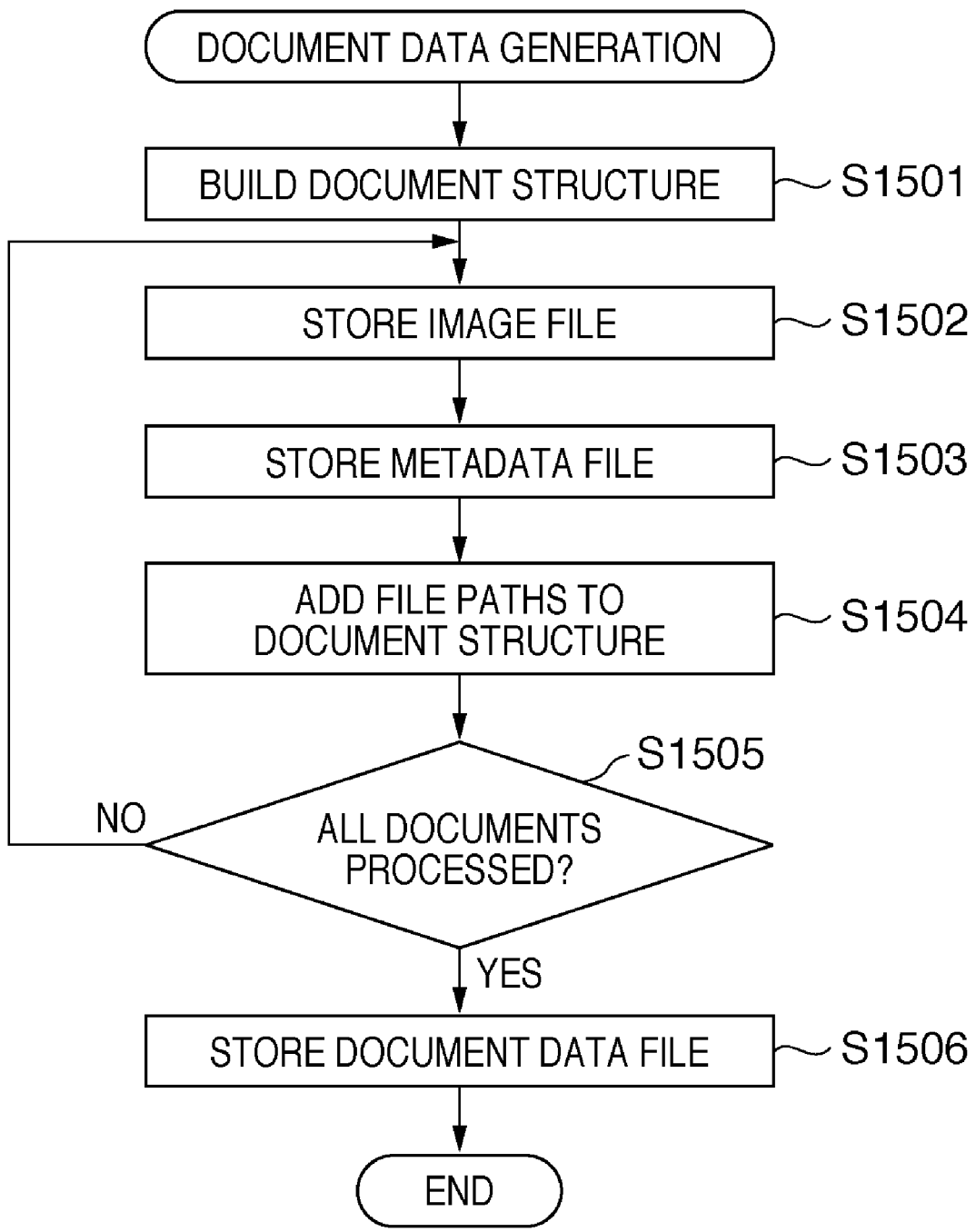

FIG. 16

| |
|---|
| PAGE COUNT |
| PAGE 1: PATH TO IMAGE FILE |
| PAGE 1: PATH TO METADATA |
| PAGE 2: PATH TO IMAGE FILE |
| PAGE 2: PATH TO METADATA |

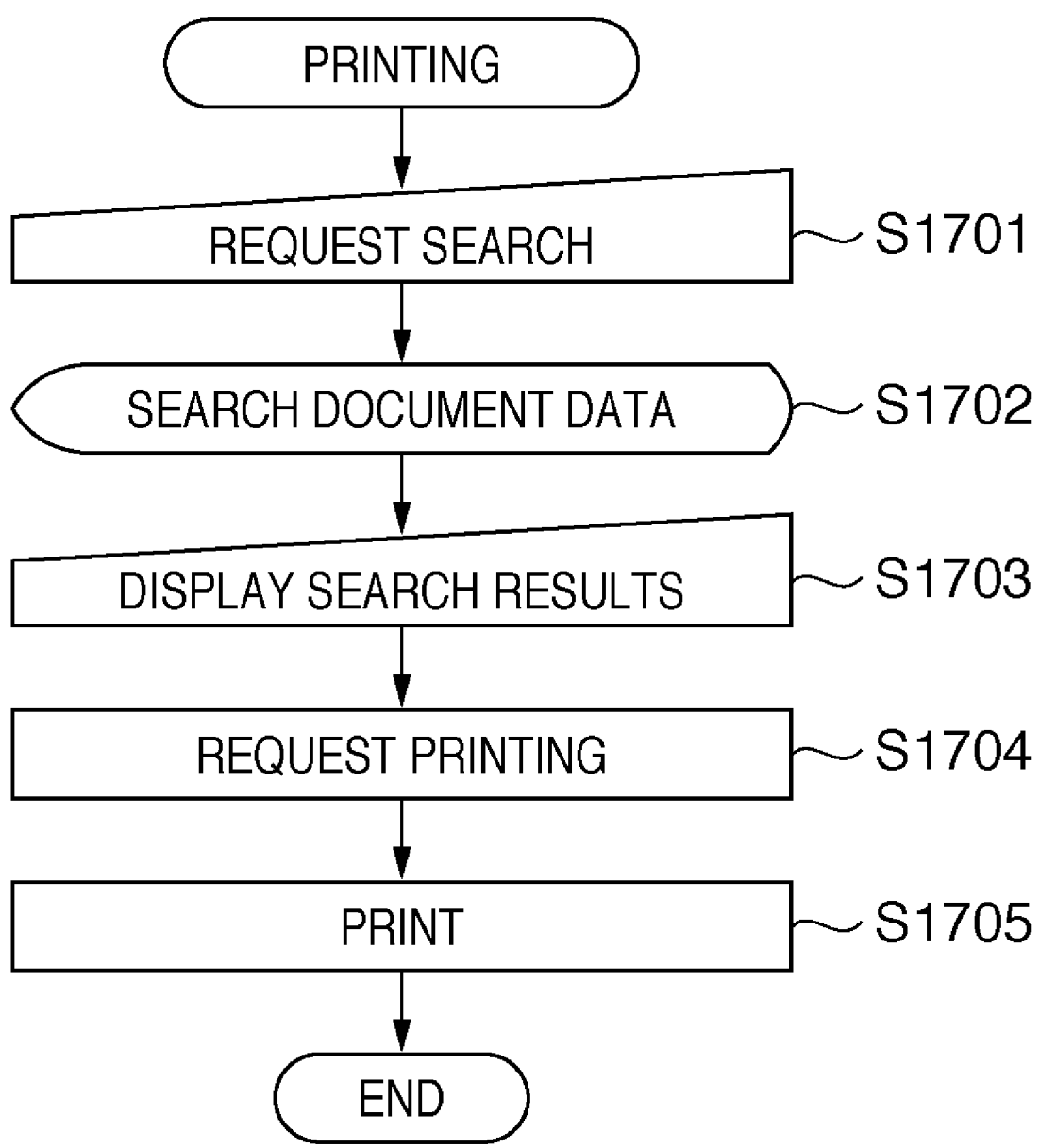
F I G. 17

METADATA DETERMINATION METHOD AND IMAGE FORMING APPARATUS

BACKGROUND OF THE INVENTION

1. Field of the Invention

The present invention relates to a technique for determining metadata from print data.

2. Description of the Related Art

Being equipped with large capacity storage devices, recent digital multi-function peripherals have the function of an image storage server which allows input images to be stored and reused, in addition to a copy function, printing function, facsimile function, and scanning function.

Conventionally, images are stored in specific mailboxes or directories, making it possible to reuse a desired image by specifying an appropriate mailbox or directory and identifying the image by its file name.

However, the large capacity storage devices mounted on digital multi-function peripherals have been increasing in capacity and in the quantity of images which can be stored. With increases in the quantity of images which can be stored, identification of stored images by specifying a mailbox or directory is approaching its limits.

Also, methods for identifying a desired image from the images stored in an image storage server include a method which stores text data as metadata together with the stored images and uses the metadata for searches.

The metadata can be extracted as character information contained in an input image by performing character recognition on the input image (see, for example, Japanese Patent Laid-Open Nos. 2004-215067 and 08-147446).

If print data is provided in the form of PDL (page-description language) data from a PC or the like, the PDL data is rasterized into a raster image and character recognition is performed on the raster image to extract character string information.

There is also a method which obtains metadata by extracting character information (character codes) contained in PDL data without the need for character recognition (see, for example, Japanese Patent Laid-Open No. 08-147446).

However, with a recognition rate being less than 100%, character recognition has the problem of accuracy: there can be recognition errors. Besides, character recognition itself involves computation costs and also has a problem in performance.

On the other hand, the method of obtaining metadata by extracting character string information from PDL data has the following problems.

(1) PDL data may contain character data treating characters as being independent of each other, in which case it is difficult to handle the character data as a continuous character string.

(2) When character images are hidden behind other drawing objects, character information which does not appear in a final raster image may be extracted.

(3) Characters may be drawn as graphics or illustrations in PDL data, in which case it is not possible to extract character information which appears in a final raster image.

SUMMARY OF THE INVENTION

An object of the present invention is to provide a technique for extracting character strings contained in character regions and non-character regions of a raster image obtained by rasterizing print data.

According to one aspect of the present invention, there is provided a metadata determination method comprising: an extraction step of extracting character data from print data; a rasterizing step of rasterizing the print data into a raster image; a region dividing step of dividing the raster image into a character region and a non-character region; and a determination step of determining character data used for metadata based on the raster image of the character region and the character data extracted in the extraction step and drawn at approximately the same position as the character region.

According to another aspect of the present invention, there is provided an image forming apparatus comprising: an extraction unit that extracts character data from print data; a rasterizing unit that rasterizes the print data into a raster image; a region dividing unit that divides the raster image into a character region and a non-character region; and a determination unit that determines character data used for metadata based on the raster image of the character region and the character data extracted by the extraction unit and drawn at approximately the same position as the character region.

Further features of the present invention will become apparent from the following description of exemplary embodiments (with reference to the attached drawings).

BRIEF DESCRIPTION OF THE DRAWINGS

FIG. 9 is a diagram showing PDL character data generated from PDL data containing separate characters;

FIG. 13A is a diagram showing raster data generated by a RIP process 311;

FIG. 13B is a diagram visually showing corresponding attribute bits;

FIG. 13C is a diagram showing an example of region division using attribute bits;

FIG. 14 is a diagram showing an example of metadata generated in the metadata generating process 306;

FIG. 15 is a flowchart showing a document data generating and storing process;

FIG. 16 is a diagram showing an example of document structure;

FIG. 17 is a flowchart showing an image file printing process;

DESCRIPTION OF THE EMBODIMENTS

Embodiments of the present invention will be described in detail below with reference to the drawings.

<Configuration of Image Forming Apparatus>

First, a hardware configuration of a color multi-function peripheral will be described with reference to FIG. 1. However, it goes without saying that the present invention is not limited to color multi-function peripherals, and may be applied to other image forming apparatus such as monochrome multi-function peripherals and special-purpose printers.

Figure 1:
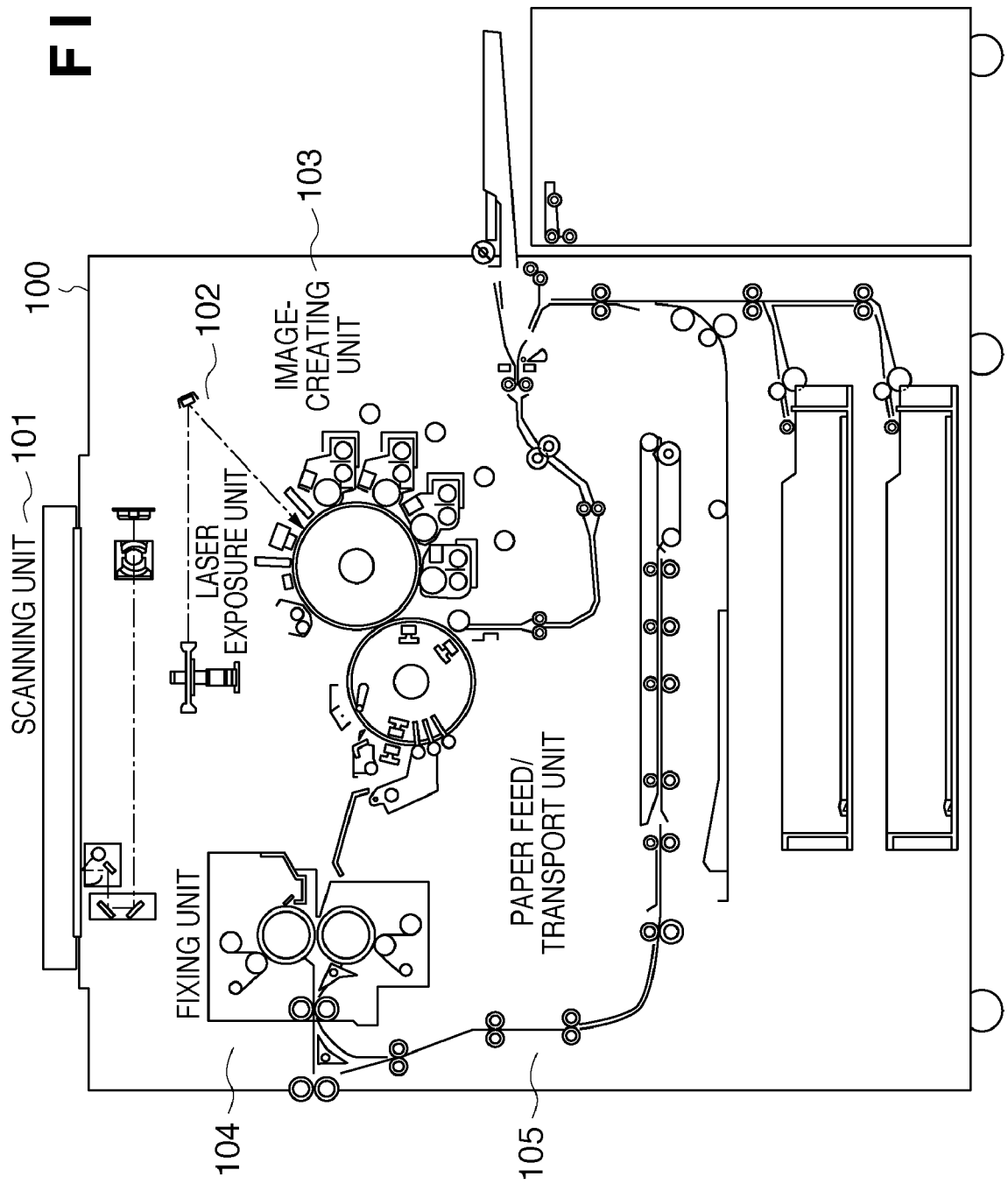
FIG. 1 is a diagram showing an exemplary hardware configuration of a color multi-function peripheral 100 according to an embodiment of the present invention.

FIG. 1 is a diagram showing an exemplary hardware configuration of a color multi-function peripheral 100 according to an embodiment of the present invention. The color multi-function peripheral 100 includes a scanning unit 101, laser exposure unit 102, image-creating unit 103, fixing unit 104, and paper feed/transport unit 105. These components are controlled by a printer controller (not shown).

The scanning unit 101 illuminates a document placed on document glass, optically reads a source image, converts the image into an electrical signal, and thereby creates image data. The laser exposure unit 102 directs a light beam, such as a laser beam, modulated according to the image data at a polygon mirror rotating at a constant angular velocity and thereby makes the light beam enter a photosensitive drum as a reflected scanning beam.

The image-creating unit 103 charges the photosensitive drum using a charger while the photosensitive drum is driven rotationally. Then, using toner, the image-creating unit 103 develops a latent image formed on the photosensitive drum by the laser exposure unit 102. The image-creating unit 103 transfers a resulting toner image to a sheet and recovers fine toner particles remaining on the photosensitive drum without being transferred. This sequence of electrophotographic processes is repeated to create an image. That is, while the sheet wound in place around a transfer drum makes four rotations, developing stations of a developing unit performs the sequence of electrophotographic processes in turns. The developing unit contains magenta (M), cyan (C), yellow (Y), and black (K) toners. Through the four rotations, a four-color toner image is transferred to the sheet. Then, leaving the transfer drum, the sheet is transported to the fixing unit 104.

The fixing unit 104 includes a combination of rollers and belts and a heat source such as a halogen heater. After the toner image is transferred to the sheet by the image-creating unit 103, the fixing unit 104 melts and fixes the toner on the sheet under heat and pressure.

The paper feed/transport unit 105 is equipped with one or more units of paper storage typified by a paper cassette or paper deck. On instructions from the printer controller, the paper feed/transport unit 105 takes one of the sheets out of the paper storage and transports the sheet to the image-creating unit 103 and fixing unit 104. The sheet is wound around the transfer drum of the image-creating unit 103. After four rotations, the sheet is transported to the fixing unit 104. During the four rotations, the Y, M, C, and K toner images are transferred to the sheet. To form images on both sides of the sheet, after passing through the fixing unit 104, the sheet is controlled to be transported again to the image-creating unit 103 through a duplex transport path.

By communicating with a control unit which controls the entire multi-function peripheral, the printer controller performs control based on instructions from the control unit. Also, the printer controller coordinates operation of the scanning unit 101, laser exposure unit 102, image-creating unit 103, fixing unit 104, and paper feed/transport unit 105 by managing their conditions.

<Configuration of Control Unit>

Figure 2:
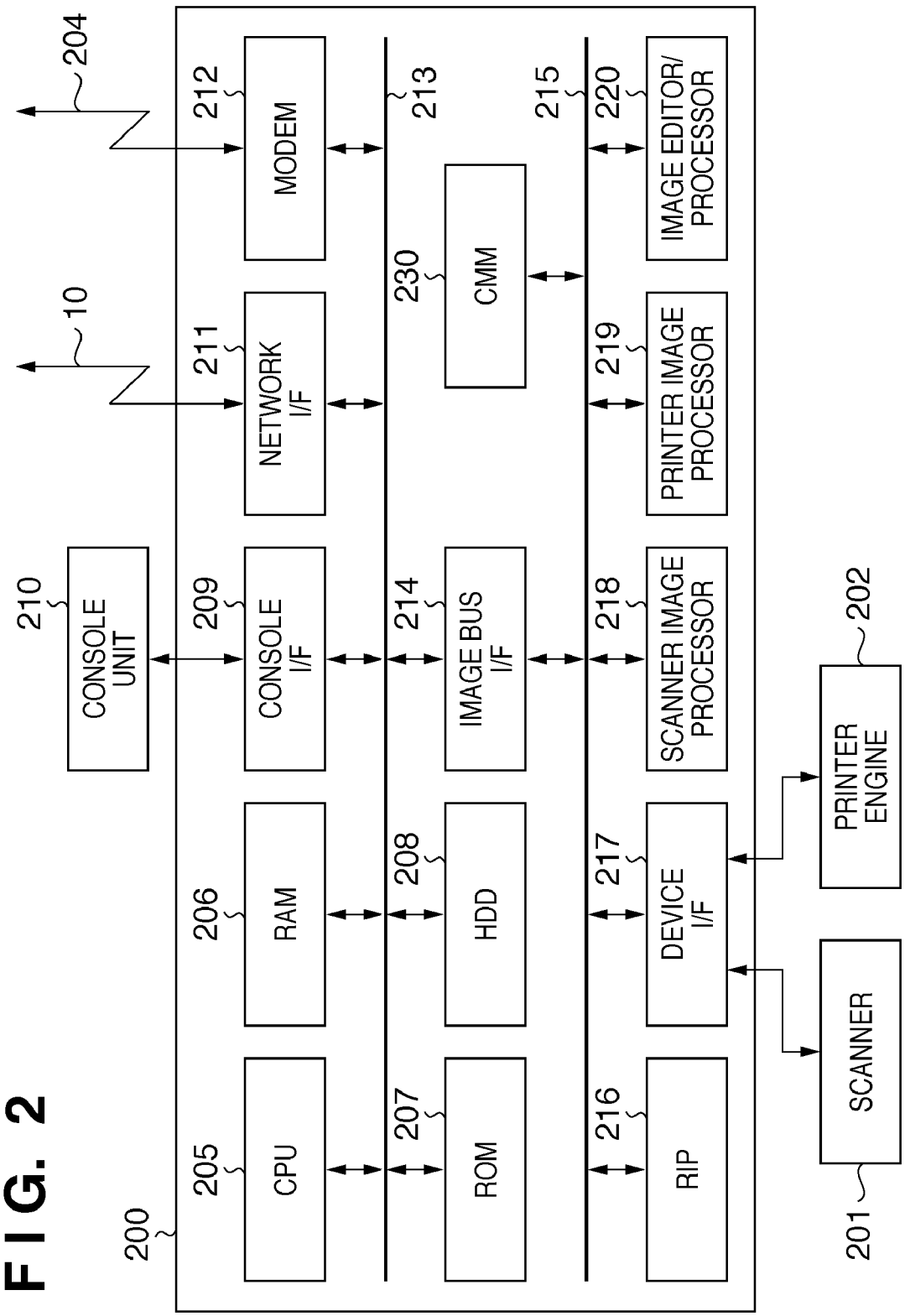
FIG. 2 is a block diagram showing an exemplary configuration of a control unit (controller) of the color multi-function peripheral 100.

FIG. 2 is a block diagram showing an exemplary configuration of the control unit (controller) of the color multi-function peripheral 100. The control unit 200 performs control in reading image data and producing printouts by being connected with a scanner 201 which is an image input device and a printer engine 202 which is an image output device. Also, by being connected to a LAN 10 or public network 204, the control unit 200 inputs and outputs image information and device information via the network.

In the control unit 200, a CPU 205 is a central processing unit which controls the entire system. A RAM 206, which provides working memory for operation of the CPU 205, also functions as image memory to temporarily store image data. A ROM 207 is a boot ROM which stores a boot program of the system. A HDD 208, that is, a hard disk drive, stores system software for various types of processing as well as input image data and document data (described later).

A console interface 209, which interfaces with a console unit 210 equipped with a display screen capable of displaying image data and the like, outputs image data to the console unit 210. Also, the console interface 209 serves to convey information entered by an operator (i.e., the user of the color multi-function peripheral) via the console unit 210 to the CPU 205. A network interface 211, which is implemented, for example, by a LAN card, connects to the LAN 10 to input and output image information from/to external devices. A modem 212 connects to the public network 204 to input and output image information from/to external devices.

The devices described above are connected to a system bus 213 of the control unit 200.

An image bus interface 214 interfaces the system bus 213 with an image bus 215 described later and provides a bus bridge used to convert data structure. The image bus 215, which is based on PCI or IEEE 1394, transfers image data at high speed. The image bus 215 is connected with such devices as a RIP 216, device interface 217, scanner image processor 218, printer image processor 219, image editor/processor 220, and CMM 230 (described later).

The RIP (raster image processor) 216 interprets a display list (DL) and creates (renders) attribute information (attribute bits) corresponding to a raster image and each pixel of the raster image. The device interface 217 performs synchronous/asynchronous conversion of image data by connecting the scanner 201 and printer engine 202 with the control unit 200.

The scanner image processor 218 performs various types of processing on input image data including correction, manipulation, and editing. The printer image processor 219 corrects output image data for the printer, converts resolution of the output image data, and so on. The image editor/processor 220 rotates and compresses/decompresses image data as well as performs various types of image processing based on the attribute bits generated by the RIP 216. The CMM (color management module) 230 is a special-purpose hardware module which performs color conversion of image data based on profiles and calibration data.

<Configuration of Controller Software>

Figure 3:
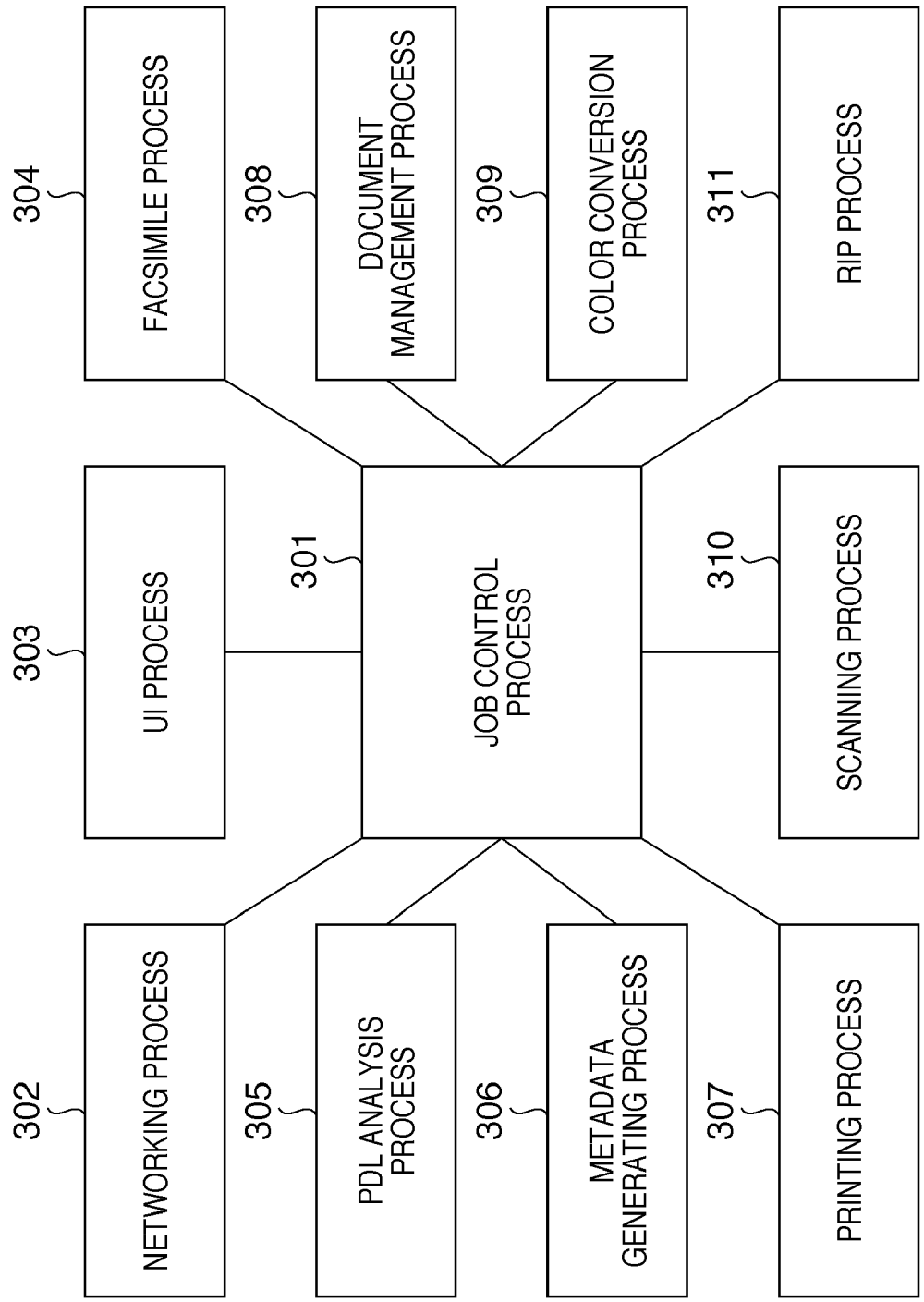
FIG. 3 is a block diagram showing an exemplary module configuration of controller software running on the control unit 200 of the color multi-function peripheral 100.

FIG. 3 is a block diagram showing an exemplary module configuration of controller software running on the control unit 200 of the color multi-function peripheral 100. The software is stored in the ROM 207 and executed by the CPU 205.

A job control process 301 takes charge of software modules (some of which are not shown) and controls all jobs generated in the color multi-function peripheral 100. A networking process 302, which is intended to control communications with external equipment mainly via the network interface 211, controls communications with various devices on the LAN 10. The networking process 302 informs the job control process 301 about contents of control commands or data received from devices on the LAN 10. Also, the networking process 302 transmits control commands or data to devices on the LAN 10 based on instructions from the job control process 301.

A UI process 303 mainly performs control related to the console unit 210. The UI process 303 informs job control process 301 about manipulations performed by the operator via the console unit 210 and controls contents of display on the display screen of the console unit 210 based on instructions from the job control process 301. A facsimile process 304 controls a facsimile function. The facsimile process 304 receives a fax via the modem 212, performs image processing unique to facsimile images, and informs the job control process 301 about the received images. Also, the facsimile process 304 transmits images specified by the job control process 301 to a specified destination by facsimile transmission.

A PDL analysis process 305 analyzes PDL data based on instructions from the job control process 301, generates DL and PDL character information (described later) which can be handled by a RIP process 311, and sends the DL and PDL character information to the job control process 301. A color conversion process 309 performs color conversion of a specified image based on instructions from the job control process 301 and informs the job control process 301 about the resulting image. The job control process 301 provides input color space information and output color space information to the color conversion process 309 and informs the color conversion process 309 of an image to be subjected to color conversion.

The RIP process 311 makes the RIP 216 render the DL generated by the PDL analysis process 305, thereby generates attribute bits corresponding to a raster image and each pixel of the raster image, and informs the job control process 301 of the attribute bits. The generated attribute bits represent attributes of a corresponding pixel. There are three bit fields—namely, one-bit color bit field, one-bit thin line/lower case bit field, and two-bit object type bit field—for a total of four bits.

The color bit indicates whether a given pixel is a constituent of a color object or black-and-white object. When the bit is "0," the pixel is a constituent of a color object. When the bit is "1," the pixel is a constituent of a black-and-white object.

The thin line/lower case bit indicates whether or not a given pixel is a constituent of a thin line or a lower-case letter. When the bit is "0," the pixel is a constituent of a thin line or a lower-case letter. When the bit is "1," the pixel is a constituent of other than a thin line and a lower-case letter.

The object type bits represent the type of the drawing object which contains a given pixel. When the bits are "01," the pixel is a constituent of a character object. When the bits are "10," the pixel is a constituent of a graphic object. When the bits are "11," the pixel is a constituent of an image object. When the bits are "00," the pixel is a constituent of a line object.

When the thin line/lower case bit is "1," if the object type bits are "01" indicating a character object, the pixel is a constituent of a lower case letter. On the other hand, if the object type bits are "00" indicating a line object, the pixel is a constituent of a thin line.

A printing process 307 prints a specified image using the image editor/processor 220, printer image processor 219, and printer engine 202 based on instructions from the job control process 301. The printing process 307 accepts information from the job control process 301, including image data, image information (image data size, color mode, and resolution), layout information (offset, scaling, and page makeup), and output paper information (size and print direction). Then, the printing process 307 performs appropriate image processing on image data using the image editor/processor 220 and printer image processor 219 and prints on specified paper using the printer engine 202.

A scanning process 310 scans a document on the scanner 201 using the scanner 201 and scanner image processor 218 based on instructions from the job control process 301. The instructions from the job control process 301 include instructions on color mode, and the scanning process 310 performs processing according to the color mode. Specifically, when the color mode is Color, the scanning process 310 inputs the document as a color image and when the color mode is monochrome, the scanning process 310 inputs the document as a monochrome image. When the color mode is Auto, the scanning process 310 determines by a prescan whether the document is color or monochrome and inputs the document based on results of the prescan.

Also, the scanning process 310 scans the document placed on the document glass of the scanner 201 and inputs a resulting image as digital data. Color information about the input image is provided to the job control process 301. Furthermore, the scanning process 310 performs appropriate image processing, such as compression, on the input image using the scanner image processor 218, and then informs the job control process 301 about the input image subjected to the image processing.

A document management process 308 generates "document data" based on instructions from the job control process 301 and stores the "document data" on the HDD 208. Also, the document management process 308 searches the HDD 208 for document data specified by the job control process 301 and informs the job control process 301 of search results.

A metadata generating process 306 generates metadata (described later) based on instructions from the job control process 301.

[First Embodiment]

A process of a first embodiment with the above configuration will be described below, where the process involves generating metadata from an input image obtained by facsimile reception or scanning or PDL data received from an external computer and thereby generating document data. In particular, a metadata determination method according to the present invention will be described in detail, where the method involves extracting character strings from PDL data and determining metadata.

<Document Data Generating Process>

First, a data flow of document data generating process will be described with reference to data flow diagrams shown in FIGS. 4 and 5. Document data is generated in response to a user command from the console unit 210 or a remote terminal when the color multi-function peripheral 100 is in image storage mode.

Figure 4:
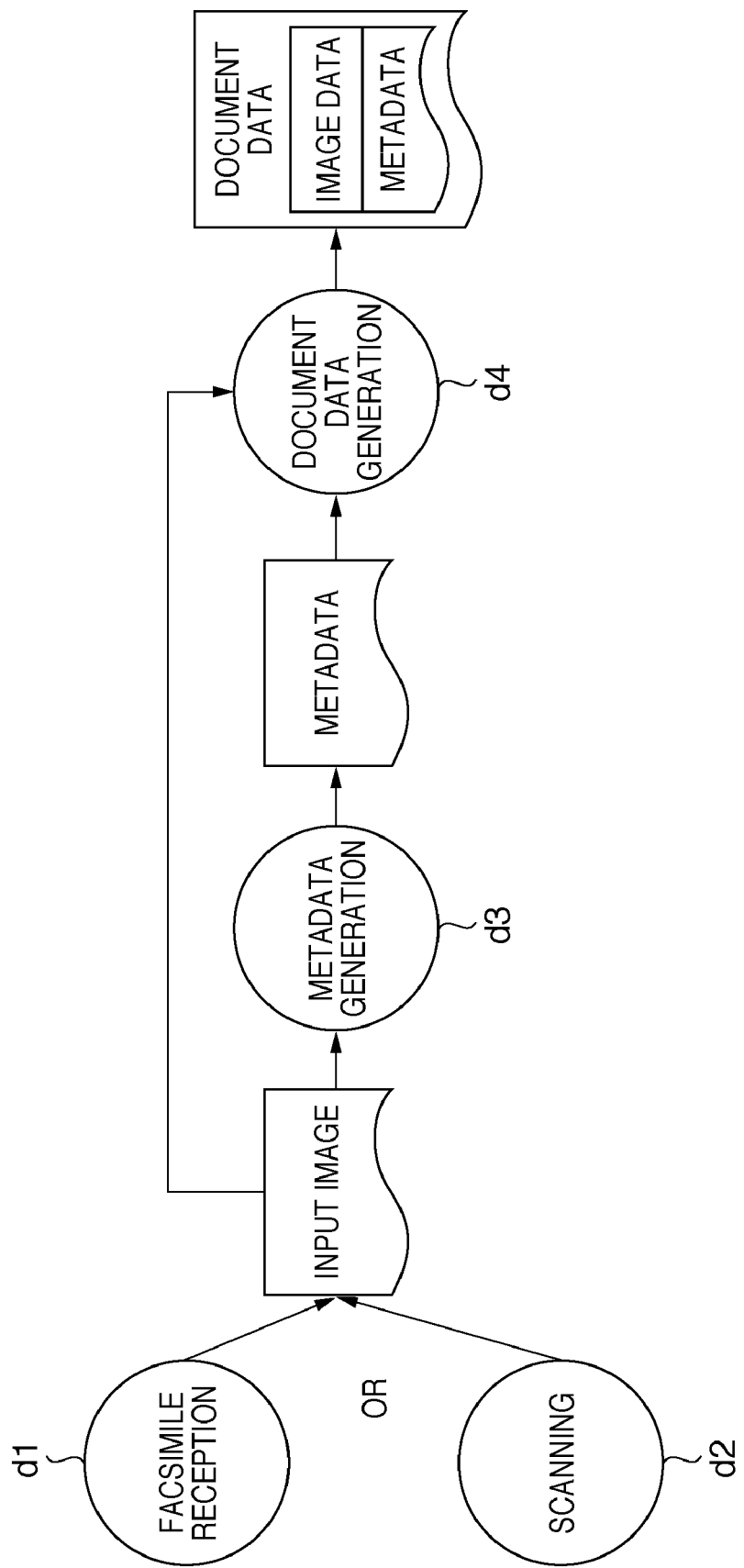
FIG. 4 is a diagram showing a data flow of document data generating process resulting from facsimile reception or image scanning.

FIG. 4 is a diagram showing a data flow of metadata generating process and document data generating process resulting from facsimile reception or image scanning. When a fax is received, the color multi-function peripheral 100 starts the facsimile process 304 and generates an input image from the received facsimile data (d1). On the other hand, when the user gives a scan command, the color multi-function peripheral 100 starts the scanning process 310 and generates an input image by performing appropriate image processing on the scanned image (d2).

Next, in metadata generation d3, when the input image resulting from facsimile reception d1 or image scanning d2 is input, metadata generating process 306 starts up and generates metadata by OCR or the like. In document data generation d4, the document management process 308 starts up, generates document data using the input image and metadata, and stores the document data in the HDD 208.

Figure 5:
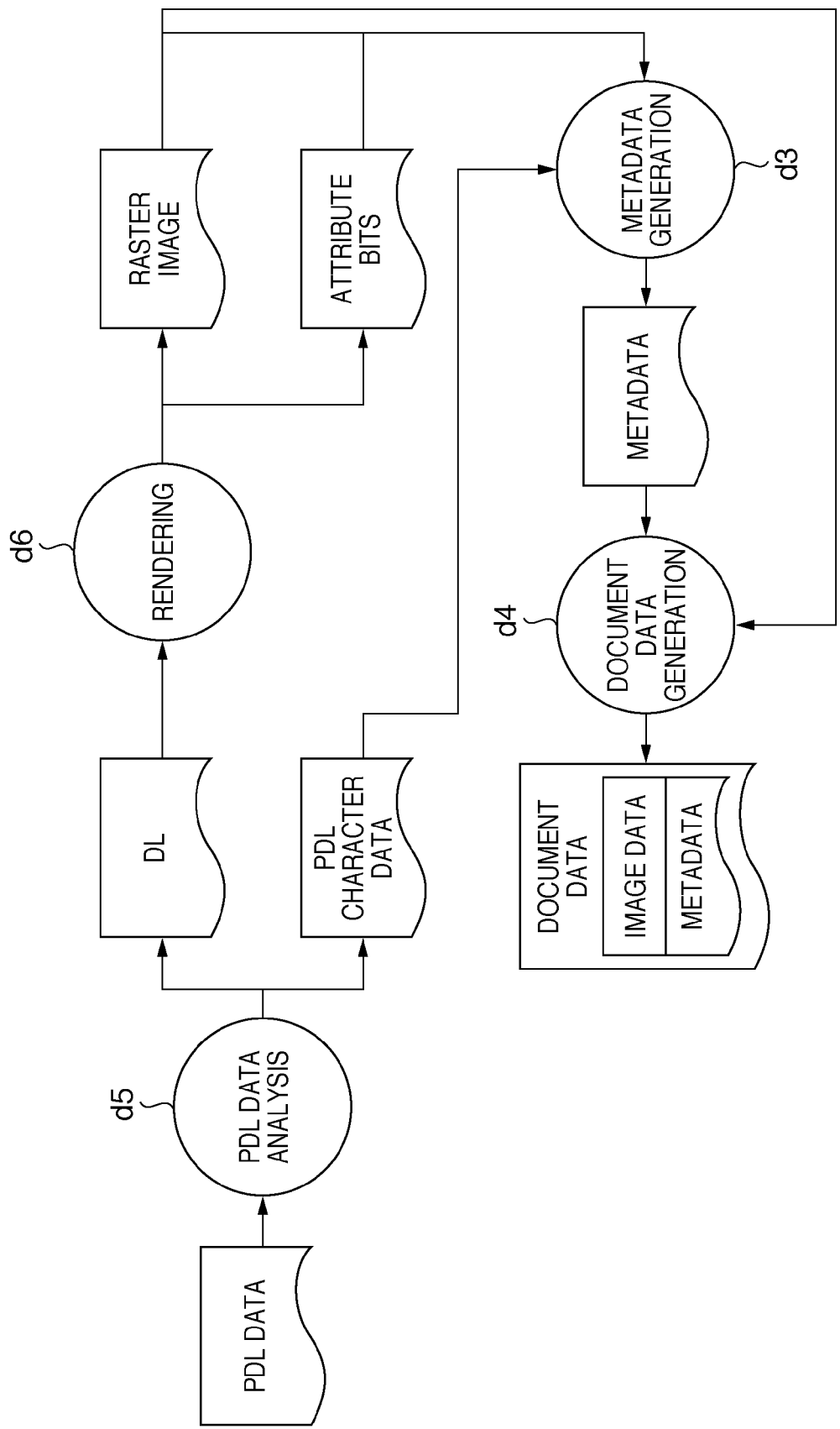
FIG. 5 is a diagram showing a data flow of document data generating process resulting from reception of PDL data.

FIG. 5 is a diagram showing a data flow of metadata generating process and document data generating process resulting from reception of PDL data. Upon receiving PDL data from an external computer, the color multi-function peripheral 100 starts the PDL analysis process 305 to generate a display list (DL) and PDL character data (d5). PDL character data will be further described later.

In rendering d6, the RIP process 311 starts up and generates raster image and attribute bits using the DL generated in the PDL data analysis d5. In metadata generation d3 upon reception of PDL data, the metadata generating process 306 starts up and generates metadata using the PDL character data generated in the PDL data analysis d5 and the raster image and attribute bits generated in the rendering d6.

In the document data generation d4 upon reception of PDL data, the document management process 308 starts up and generates document data using the raster image and metadata and stores the document data in the HDD 208.

<PDL Analysis Process>

The process of generating a DL and PDL character data from PDL data will be described with reference to FIG. 6.

Figure 6:
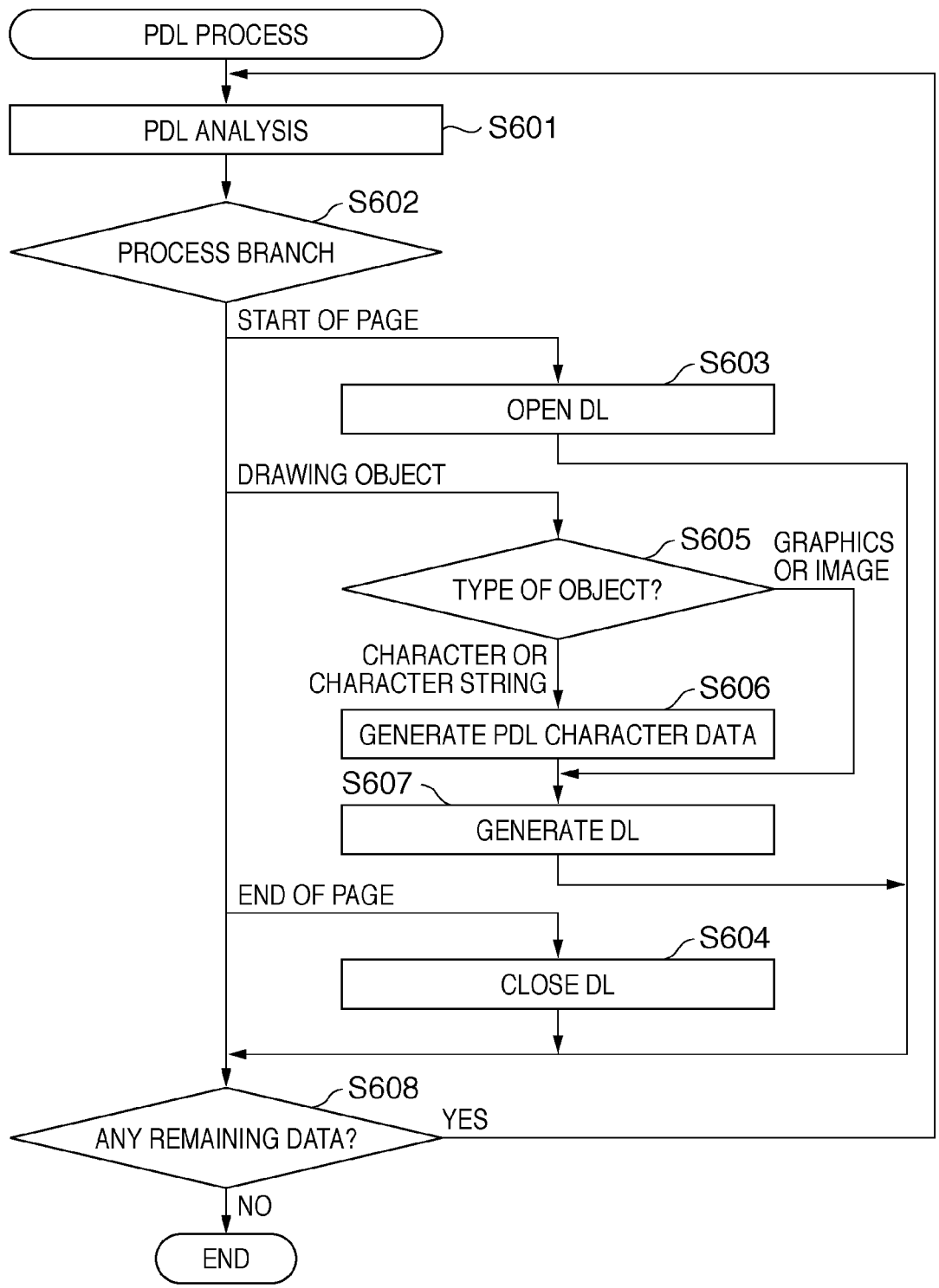
FIG. 6 is a flowchart showing a PDL analysis process according to a first embodiment.

FIG. 6 is a flowchart showing the PDL analysis process according to the first embodiment. PDL data transmitted to the color multi-function peripheral 100 via an external network or the LAN 10 is reported to the job control process 301 via the networking process 302. The job control process 301 starts the PDL analysis process 305 in order for the latter to analyze the PDL data.

The PDL analysis process 305 analyzes the transmitted PDL data (S601) and then branches to an appropriate step to process the PDL data, depending on results of the analysis as follows (S602). If the results of analysis show that the PDL data contains start-of-page data, the PDL analysis process 305 goes to S603 where the PDL analysis process 305 opens a DL to start a new page. Then, the PDL analysis process 305 goes to S608. If it is determined that the PDL data contains end-of-page data, the PDL analysis process 305 goes to S604. In S604 the PDL analysis process 305 performs an end-of-page process: namely, converts the DL into format interpretable by the RIP process 311 and closes the DL. Then, the PDL analysis process 305 goes to S608.

If the results of analysis show that the PDL data contains data of a drawing object, the PDL analysis process 305 goes to S605. In S605, the PDL analysis process 305 determines the type of the drawing object. If the type of the drawing object is a character or character string, the PDL analysis process 305 goes to S606 to extract information about the drawing object of character or character string, and thereby generate PDL character data. A drawing object of character or character string contains character codes of the characters to be drawn as well as information about size and drawing position. Using this information, the PDL analysis process 305 generates PDL character data, specifically, text information and a bounding box of the entire character string as well as text information and information about bounding boxes of individual characters in the character string. Then, the PDL analysis process 305 goes to S607.

On the other hand, if the drawing object is graphics or an image, the PDL analysis process 305 goes to S607. In S607, the PDL analysis process 305 generates a DL in order for the RIP process 311 to render the drawing object. The DL contains information about each object, including its shape and color, designation of logic drawing, and object type.

Next, in S608, the PDL analysis process 305 determines whether there is any remaining PDL data to be analyzed. If there is remaining PDL data, the PDL analysis process 305 returns to S601 to continue PDL analysis. Then, the PDL analysis process 305 repeats S601 to S608 described above. When analysis of the PDL data is completed, the PDL analysis process 305 finishes processing.

There are various types of PDL including LIPS (trademark) and PS (trademark), but appropriate PDL analysis logic can be used in S601 depending on the language used. Incidentally, LIPS (trademark) stands for LBP Image Processing System and PS (trademark) stands for PostScript.

The job control process 301 determines the type of PDL in advance so that appropriate logic will be used when the PDL analysis process 305 executes.

<PDL Character Data>

Now, PDL character data will be described with reference to FIGS. 7 to 9, where the PDL character data is generated by the PDL analysis process 305 by analyzing PDL data and extracting character string information from the PDL data. Output PDL data can vary depending on the types of application and printer driver. That is, the same text/character string can be described differently in PDL data depending on the type of application or printer driver. For example, when an application outputs multiple characters as a single character string to a driver and the driver creates PDL data, the characters can be described as a character string. On the other hand, when an application outputs the multiple characters as separate characters to the driver, since the driver creates PDL data by treating the characters separately, the characters can be described as independent characters or appear in a different order.

Figures 7, 8:
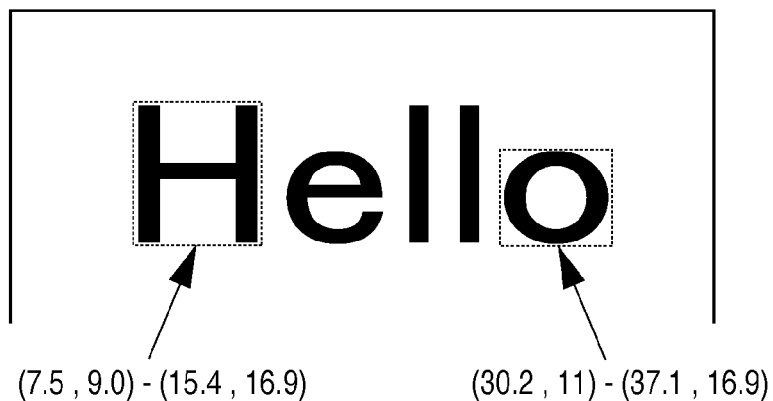
FIG. 7 is a diagram showing a drawing produced from PDL data containing a character string "Hello" as a drawing object.
FIG. 8 is a diagram showing PDL character data generated from PDL data containing a character string.

FIG. 7 is a diagram showing a drawing produced from PDL data containing a character string "Hello" as a drawing object. FIG. 8 is a diagram showing an example of PDL character data generated by extracting a character string described together in PDL data. FIG. 9 is a diagram showing an example of PDL character data generated by extracting a character string whose characters are described separately in PDL data.

In FIGS. 8 and 9, <Strings> tags contain information about a character string described in PDL data. Also, one or more <Char> tags are contained between a <Strings> tag and </Strings> tag to describe information about each character to be drawn. Between a <Char> tag and </Char> tag, information about each character in the character string to be drawn is described using a <Bbox> tag and <Text> tag.

A String-Bbox attribute in the <Strings> tag represents a bounding box (a circumscribed rectangle in which the character string is drawn) of the character string. In the example of FIG. 8, the character string "Hello" is drawn in a rectangular area defined by upper left coordinates (7.5, 9.0) and lower right coordinates (37.1, 16.9).

A String-text attribute in the <Strings> tag includes text information (character codes) designated as a character string. In the example of FIG. 8, text information of a character string is "Hello." In the example of FIG. 9, each character is described in a separate <Strings> tag, text information of the first character string being "H."

A Strings-ID attribute in the <Strings> tag includes ID information which can uniquely identify the <Strings> tag's block in metadata.

Between a <Char> tag and </Char> tag, information about each character in the character string to be drawn is described, with a <Bbox> tag defining an area (bounding box) in which a single character represented by the <Char> tag is drawn. In the example of FIG. 8, the character "H" contained in the character string "Hello" is located in a rectangular area defined by upper left coordinates (7.5, 9.0) and lower right coordinates (15.4, 16.9).

When the characters in a character string are described separately as shown in FIG. 9, the bounding box represented by the String-Bbox attribute coincides with the bounding box represented by the <Bbox> tag below the <Char> tag.

The <Text> tag below the <Char> tag represents text information (character codes) of the character corresponding to the <Char> tag. <Metadata Generating Process>

Now, metadata generation by the metadata generating process 306 will be described with reference to FIGS. 10 to 13A, 13B, and 13C.

Figure 10:
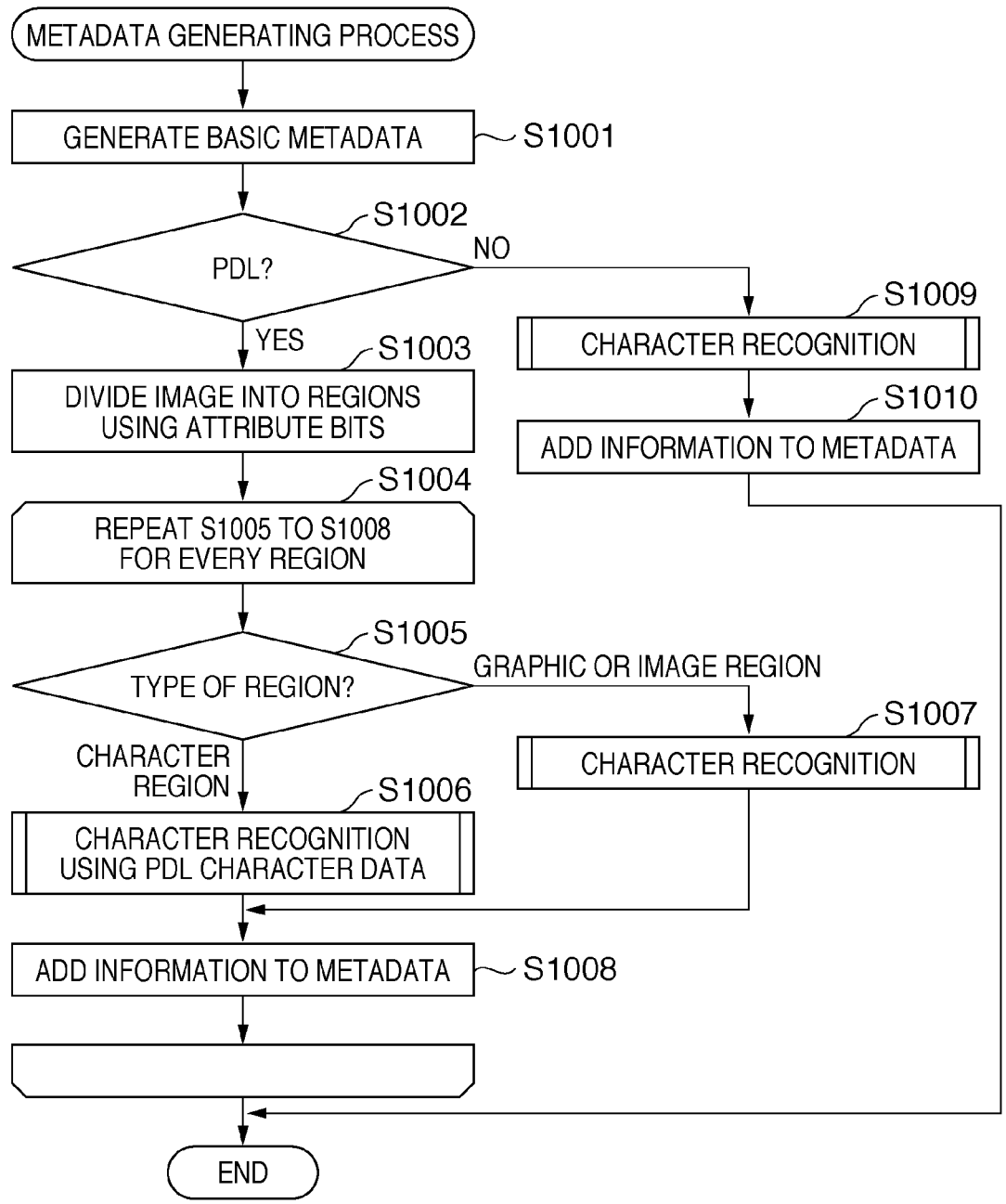
FIG. 10 is a flowchart showing a metadata generating process 306.

FIG. 10 is a flowchart showing the metadata generating process 306. In S1001, the metadata generating process 306 generates basic metadata to be associated with input data (scanned image, facsimile image, or PDL data). The basic metadata includes input type (scanned, facsimile, PDL), page number, creation date and time, operator information, color/monochrome information, application type, and sender information. The application type is included only when PDL data is received. The sender information is included only when PDL data or a fax is received.

The information included as basic metadata information is not limited to the information described above, and needless to say, other information may be included as well.

In S1002, the metadata generating process 306 determines the type of input data. If the type of input data is PDL data, the metadata generating process 306 goes to S1003. If the type of input data is image data acquired by facsimile or scanning the metadata generating process 306 goes to S1009. In S1003, the metadata generating process 306 identifies regions by dividing them into character regions and non-character regions (graphic regions and image regions) using the attribute bits generated in the RIP process 311 by interpreting and rendering the PDL data. Then, the metadata generating process 306 repeats S1005 to S1008 for each region identified as a character region or non-character region (S1004).

FIG. 13A is a diagram showing raster image data generated by the RIP process 311. FIG. 13B is a diagram visually showing corresponding attribute bits. FIG. 13C is a diagram showing an example of region division using attribute bits.

It can be seen from FIG. 13B what type of drawing object is drawn using each pixel in a raster image. Based on the attribute bit information, the raster image is divided into rectangular regions boxed in FIG. 13C. In the example of FIG. 13C, the raster image is divided into one graphic region, two image regions, and one character region.

In S1005, the metadata generating process 306 determines the type of targeted region, and goes to either S1006 or S1007, depending on a result of the determination. The metadata generating process 306 goes to S1006 if the targeted region is a character region, and to S1007 if the targeted region is a graphic or image region.

In S1006 or S1007, the metadata generating process 306 extracts character string information from the targeted region, using character recognition (described later). Then, the metadata generating process 306 goes to S1008. In S1008, the metadata generating process 306 adds the character string information extracted in S1006 or S1007 to the metadata.

On the other hand, if the type of input data is a facsimile image or scanned image, the metadata generating process 306 goes to S1009 to perform character recognition such as in S1007 on the entire input image. In S1010, the metadata generating process 306 adds the character string information extracted in S1009 to the metadata and thereby finishes processing.

Figure 11:
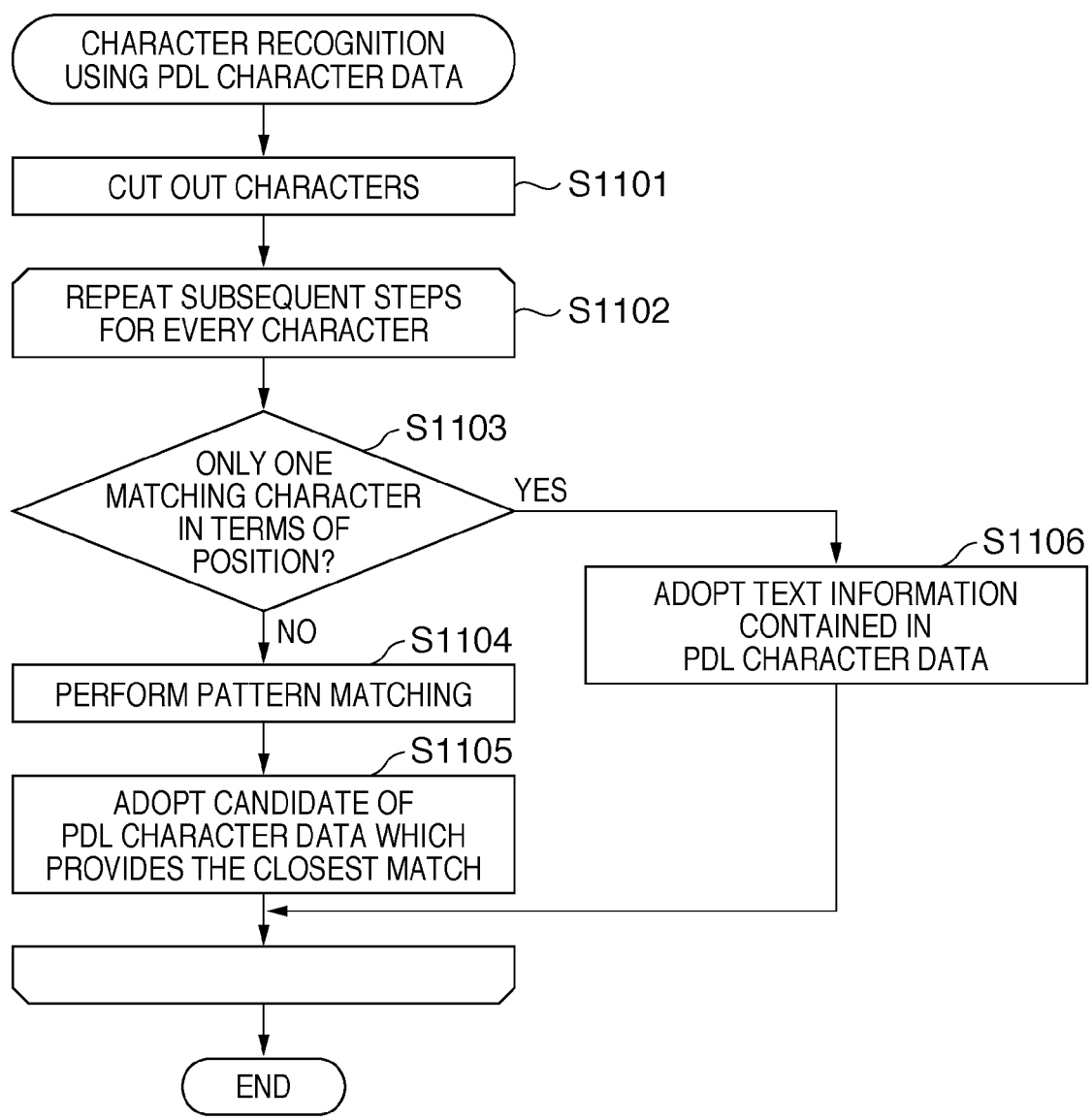
FIG. 11 is a flowchart showing details of a character recognition process performed in S1006 using PDL character data.

FIG. 11 is a flowchart showing details of the character recognition process performed in S1006 using PDL character data. In S1101, the metadata generating process 306 cuts out characters from the targeted character region. To cut out characters, the metadata generating process 306 determines whether the characters are written vertically or horizontally, cuts out a line in the appropriate direction, and finally cuts out the characters.

The determination as to whether the characters are written vertically or horizontally is made based on distribution of vertical and horizontal projections (or histograms) produced from the bits which represent character objects out of the attribute bits in the region. For example, if variance of the horizontal projection is larger, it is determined that the characters are written horizontally in the region. On the other hand, if variance of the vertical projection is larger, it is determined that the characters are written vertically in the region. To cut out the characters, in the case of horizontal writing, an appropriate line is cut out using the horizontal projection and then the characters are cut out based on the vertical projection of the line. In the case of a region with vertical writing, the horizontal and vertical directions are interchanged.

Next, steps S1102 to S1106 are carried out in sequence for each of the characters cut out. The characters are processed rightward beginning with the upper left character in the case of horizontal writing, or processed downward beginning with the upper right character in the case of vertical writing.

In S1103, the metadata generating process 306 determines a bounding box (rectangle circumscribed on the character) for the targeted character which has been cut out, compares the bounding box with bounding box information about each character in the PDL character data, and searches for any matching character. Incidentally, in the case of PDL character data (PDL data), if multiple character objects are superimposed when the data is created by an application, the bounding boxes for the multiple characters may be located at the same position. Thus, in the search in S1103, the metadata generating process 306 determines whether or not there is only one matching character. If there are two or more matching characters, the metadata generating process 306 goes to S1104. If there is only one matching character, the metadata generating process 306 goes to S1106. The bounding box information does not need to match exactly. For example, the bounding box for the targeted character can be regarded to match the bounding box for a character in the PDL character data if the bounding boxes overlap 95%.

In S1104, the metadata generating process 306 selects multiple characters with matching bounding boxes from the PDL character data as candidates and performs pattern matching (OCR process) between the targeted character and the candidates using bitmaps. In S1105, the metadata generating process 306 selects the candidate which provides the closest match from the multiple candidates and adopts its text information as a recognition result of the targeted character.

On the other hand, in S1106, the metadata generating process 306 adopts text information of the character which, being contained in the PDL character data, matches the bounding box of the targeted character, as a recognition result of the targeted character.

Incidentally, the character string extracted as a result of character recognition using the PDL character data contains text information of characters arranged in the order in which the characters are recognized (being extracted from the targeted character region). That is, the characters are arranged in the order in which they appear in the raster image rather than in the PDL character data.

Figure 12:
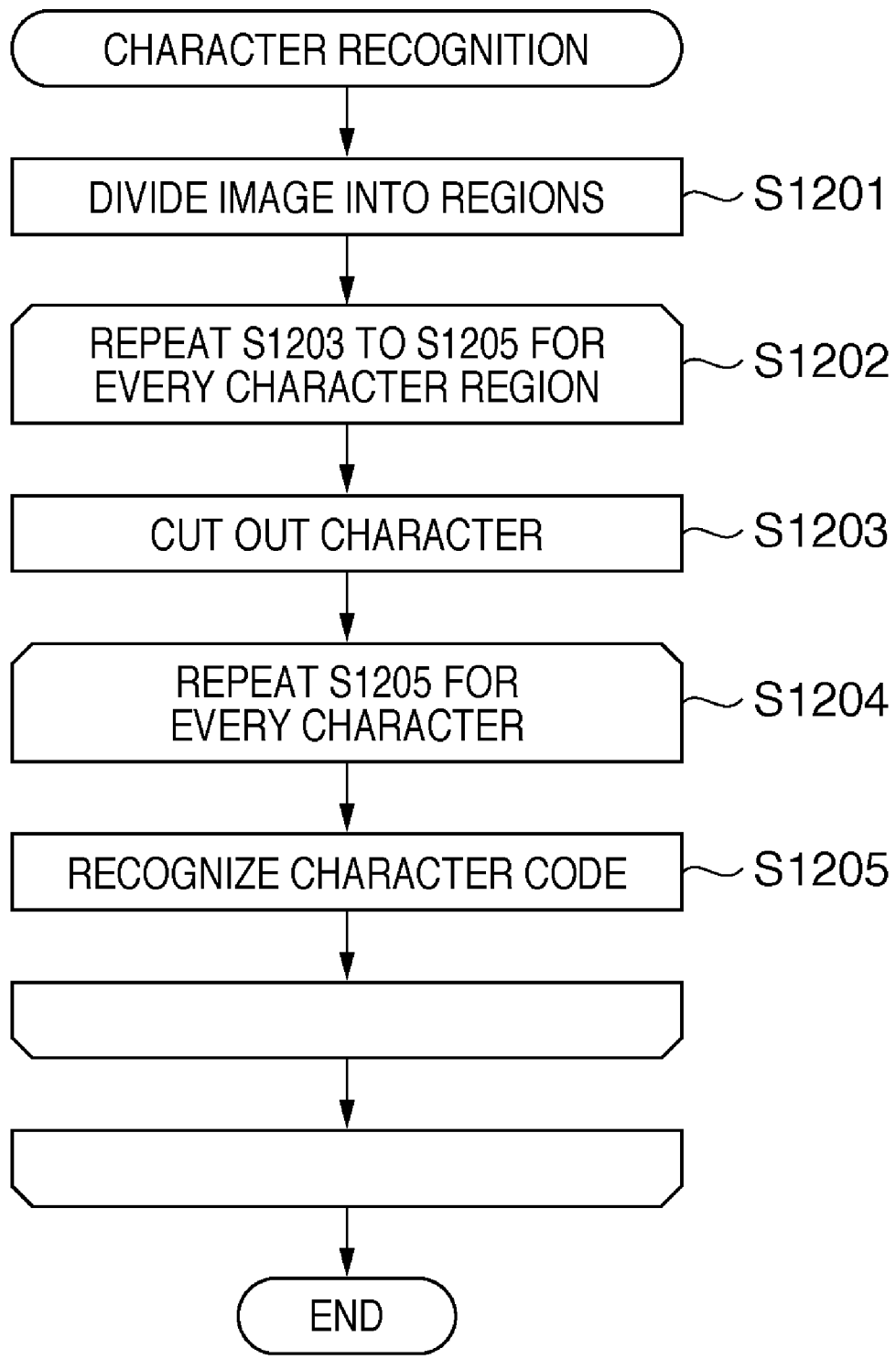
FIG. 12 is a flowchart showing details of a character recognition process performed in S1007 and S1009.

FIG. 12 is a flowchart showing details of the character recognition process performed in S1007 and S1009. In S1201, the metadata generating process 306 divides the targeted image into regions and thereby cuts out a character region. An embodiment of the region division will be described below.

First, the targeted image is binarized into black and white. Then, by tracking contours made up of black pixels, pixel blocks surrounded by the contours of black pixels are extracted from a binary image obtained as a result of the binarization. If there is a black pixel block of a large area, blocks of white pixels are extracted from the black pixel block by tracking contours made up of white pixels. Furthermore, if there is any white pixel block of an area larger than a predetermined area among the extracted white pixel blocks, black pixel blocks are extracted recursively from the white pixel block.

Incidentally, although an image printed in black on a white background has been described in this example, an image in which other colors are used can be processed similarly by treating the background color as "white" and colors of objects as "black."

The black pixel blocks thus obtained are classified into regions of different attributes according to size and shape. For example, black pixel blocks whose slenderness ratio is approximately equal to 1 and whose size falls within a certain range are regarded to correspond to characters. Furthermore, a group of adjacent characters which are aligned neatly is classified into a character region.

A flat pixel block is classified into a line region, a region occupied by a black pixel block which neatly encloses a quadrilateral white pixel blocks is classified into a table region, a region in which pixel blocks of indefinite shape are scattered is classified into an image region, and pixel blocks of any other shape are classified into graphic regions.

Steps S1203 to S1205 are applied in sequence to every character region cut out in S1201 (S1202).

In S1203, a character is cut out from the targeted character region. To cut out characters, the metadata generating process 306 determines whether the characters are written vertically or horizontally in a binary image of the region, cuts a line in the appropriate direction, and finally cuts out the characters to obtain character images. The determination as to whether the characters are written vertically or horizontally is made based on distribution of vertical and horizontal projections (or histograms) of pixel values in the region. For example, if variance of the horizontal projection is larger, it is determined that the characters are written horizontally in the region. On the other hand, if variance of the vertical projection is larger, it is determined that the characters are written vertically in the region.

To cut out the character string and then the characters, in the case of horizontal writing, an appropriate line is cut out using the horizontal projection and then the characters are cut out based on the vertical projection of the line. In the case of a region with vertical writing, the horizontal and vertical directions are interchanged.

In S1205, the characters cut out in S1203 are subjected to character code recognition one after another. The characters are processed rightward beginning with the upper left character in the case of horizontal writing, or processed leftward beginning with the upper right character in the case of vertical writing.

An example of character code recognition will be described. In character code recognition, images cut out on a character by character basis are recognized using a pattern matching technique to obtain corresponding character codes (text information). The process of character code recognition involves comparing an observed feature vector with dictionary feature vectors determined in advance for individual character types and selecting, as a recognition result, the character type which gives the shortest distance, where the observed feature vector is obtained by converting features of a character image into a numeric string having tens of dimensions.

Various publicly known methods are available for use to extract feature vectors, including, for example, a method which divides a character into a mesh pattern, determines the number of mesh cells using character lines in each direction in the mesh as line elements, and extracts a feature vector having as many dimensions as the number of mesh cells.

When the character codes of all the characters cut out in S1203 have been recognized, the character recognition process is finished.

The character string extracted as a result of the character recognition process contains text information of the characters in the order in which the characters have been recognized.
<Metadata>

FIG. 14 is a diagram showing an example of metadata generated in the metadata generating process 306. A Kind attribute in a <Metadata> tag block contains information about the input type, which is PDL data in this example. A PageNo attribute contains information about a page number, which is "1" in this example, meaning that the metadata corresponds to a raster image on the first page generated from the PDL data. A Date attribute contains information about a creation date and time, which indicates in this example that the metadata was created at 0 o'clock on Jan. 1, 2006.

A User attribute contains operator information, which is "AAA" in this example, meaning that the user has sent the PDL data to the color multi-function peripheral 100. A Color attribute contains color/monochrome information, which is "BW" in this example, meaning that the raster image generated by the RIP process 311 is monochrome.

An Application attribute contains information about an application type, which is "MEMO" in this example, meaning that the PDL data has been created using an application named "MEMO." A From attribute contains sender information, which is "192.168.1.0" in this example, meaning that the PDL data has been sent from a PC with an IP address of "192.168.1.0."

The attributes described above are created in S1001 and added to the metadata.

A <TEXT> tag block in the <Metadata> tag block contains character string information added in S1008 or S1010. In this example, the character string information indicates that the raster image generated by the RIP process 311 contains character strings "It rained yesterday." and "It will be fine today."
<Document Management Process>

Now, a document data generating and storing process performed in the document management process 308 will be described with reference to FIGS. 15 and 16.

FIG. 15 is a flowchart showing a document data generating and storing process. When informed about document data generation by the job control process 301, the document management process 308 builds a document structure (S1501). FIG. 16 is a diagram showing an example of document structure. The document structure holds information about the number of pages contained in document data, a path to an image file on each page, and a path to a metadata file on each page. When the document structure is built, the number of pages is zero and there is no file path.

From the job control process 301, the document management process 308 receives a raster image generated by the RIP process 311, input image generated by the facsimile process 304, and input image generated by the scanning process 310. The document management process 308 stores the received image in the HDD 208 as an image file (S1502). In this way, according to the present embodiment, raster images (images generated from PDL data as a result of an RIP process, facsimile image, scanned image) are stored as image files (image data). Incidentally, vector data obtained by vectorizing the raster images may be stored together with the raster images. If vector data is stored, even when it becomes necessary to scale up the images for reuse, the use of the vector data makes it possible to reproduce the raster images by maintaining high image quality.

Next, the document management process 308 receives metadata generated by the metadata generating process 306 from the job control process 301 and stores the received metadata in the HDD 208 as a metadata file (S1503).

In S1504, the document management process 308 adds the path of the image file stored in S1502 and path of the metadata file stored in S1503 to the document structure and increments the page count of the document structure.

The document management process 308 repeats S1502 to S1504 until notified about the end of the document by the job control process 301 (S1505). Upon receiving a notification about the end of the document, the document management process 308 goes to S1506 where the document management process 308 stores the document structure as a document data file in the HDD 208 and thereby finishes processing.

<Printing Process>

Next, the process of printing image files accumulated in the color multi-function peripheral 100 will be described with reference to FIG. 17. FIG. 17 is a flowchart showing an image file printing process.

First, the user specifies a search keyword on the console unit 210 or on a remote UI connected via the LAN 10 and thereby requests a search for image files desired to be printed (S1701). A search keyword is specified in relation to the input type (scanned, facsimile, PDL), page number, creation date and time, operator information, color/monochrome information, application type, sender information, or character string contained in the image. Also, multiple keywords may be specified using Boolean operators such as AND and OR.

When the user requests a search, the job control process 301 informs the document management process 308 of the specified search conditions and instructs the document management process 308 to search the document data stored in the HDD 208 (S1702). Being instructed to search the document data, the document management process 308 reads the document data files stored in the HDD 208. Then, the document management process 308 reads the metadata files one after another based on the metadata file paths described in the document data files and extracts the metadata which satisfies the specified search conditions. Then, the document management process 308 sends the document data files which contain the extracted metadata and the page numbers of the extracted metadata to the job control process 301.

Upon receiving the search results, the job control process 301 displays a search result list on the console unit 210 or remote UI from which the search request has been received (S1703). In the search result list, the job control process 301 displays the file names and update times of the document data files as well as the page numbers which satisfy the search conditions.

Incidentally, the information displayed in the list is not limited to the above example, information contained in the basic metadata may be displayed as detailed information or preview images may be displayed.

The user specifies a desired image file in the displayed search result list and makes a print request (S1704). In the print request, the user may specify all pages in the document data or only specific pages.

The job control process 301 informs the document management process 308 of the document data specified in the print request and the pages to be printed and reads out the image file. The image data read out of the image file is sent to the printing process 307 and printed by the printing process 307 (S1705).

The first embodiment makes it possible to extract text information with high accuracy and high performance based on the character information extracted from PDL data and the attribute bits generated as a result of rasterization.

[Second Embodiment]

Next, a second embodiment of the present invention will be described in detail with reference to drawings. According to the second embodiment, when even a part of a drawing object specified in PDL data as a character string is drawn on an output image, the entire character string is added to the metadata. This process corresponds to the process described in FIG. 11 according to the first embodiment.

Figure 18:
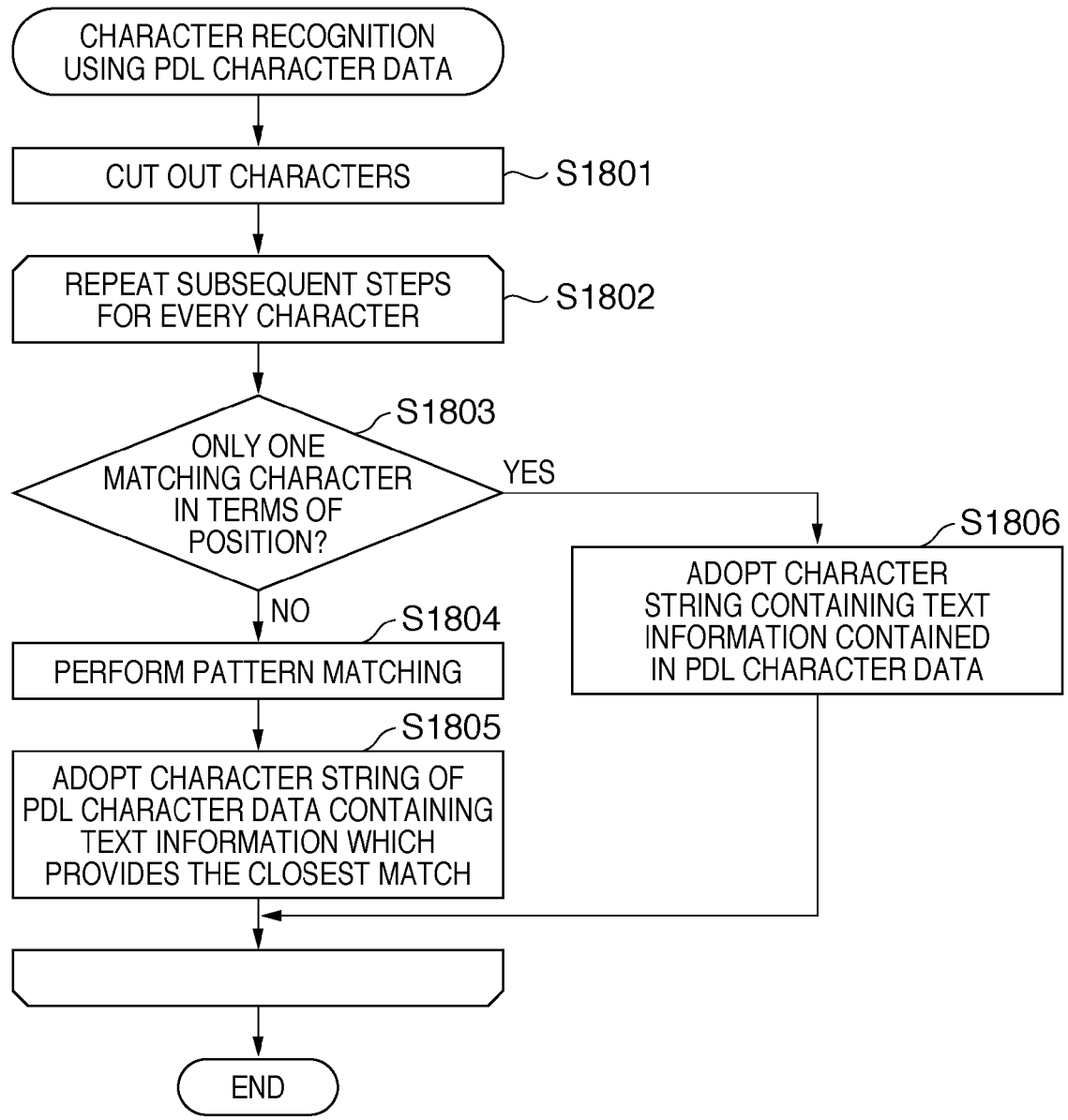
FIG. 18 is a flowchart showing details of a character recognition process using PDL character data according to a second embodiment.

FIG. 18 is a flowchart showing details of a character recognition process using PDL character data according to the second embodiment. In S1801, the metadata generating process 306 cuts out characters from the targeted character region. To cut out characters, the metadata generating process 306 determines whether the characters are written vertically or horizontally, cuts out a line in the appropriate direction, and finally cuts out the characters.

The determination as to whether the characters are written vertically or horizontally is made based on distribution of vertical and horizontal projections (or histograms) produced from the bits which represent character objects out of the attribute bits in the region. For example, if variance of the horizontal projection is larger, it is determined that the characters are written horizontally in the region. On the other hand, if variance of the vertical projection is larger, it is determined that the characters are written vertically in the region. To cut out the characters, in the case of horizontal writing, an appropriate line is cut out using the horizontal projection and then the characters are cut out based on the vertical projection of the line. In the case of a region with vertical writing, the horizontal and vertical directions are interchanged.

Next, steps S1802 to S1806 are carried out in sequence for each of the characters cut out. The characters are processed rightward beginning with the upper left character in the case of horizontal writing, or processed downward beginning with the upper right character in the case of vertical writing.

In S1803, the metadata generating process 306 determines a bounding box for the targeted character which has been cut out, compares the bounding box with bounding box information about each character in the PDL character data, and searches for any matching character. If it is found as a result of the search that there are two or more matching characters, the metadata generating process 306 goes to S1804. If there is only one matching character, the metadata generating process 306 goes to S1806. The bounding box information does not need to match exactly. For example, the bounding box for the targeted character can be regarded to match the bounding box for a character in the PDL character data if the bounding boxes overlap 95%.

In S1804, the metadata generating process 306 selects multiple characters with matching bounding boxes from the PDL character data as candidates and performs pattern matching between the targeted character and the candidates using bitmaps. In S1805, the metadata generating process 306 selects the candidate which provides the closest match from the multiple candidates and adds the text information of the entire character string containing the selected character as a recognition result.

The Strings-ID information of the character string adopted once is stored in the RAM 206 and a character string to be adopted is not added as a recognition result if its Strings-ID information is already stored.

On the other hand, in S1806, the metadata generating process 306 adopts and adds a character string containing the character which, being contained in the PDL character data, matches the bounding box of the targeted character, as a recognition result of the targeted character. Again, the Strings-ID information of the character string adopted once is stored in the RAM 206 and a character string to be adopted is not added as a recognition result if its Strings-ID information is already stored.

Incidentally, the character string extracted as a result of character recognition using the PDL character data contains text information of characters arranged in the order in which the characters are recognized.

In addition to the advantages of the first embodiment, the second embodiment has the following advantage: namely, when even a part of a drawing object specified in PDL data as a character string is drawn on an output image, the entire character string can be added to the metadata.

[Third Embodiment]

Next, a third embodiment of the present invention will be described in detail with reference to drawings. According to the third embodiment, in generating metadata, the user is allowed to select whether a search should be targeted at only the characters contained in an output image or an entire character string.

Figure 19:
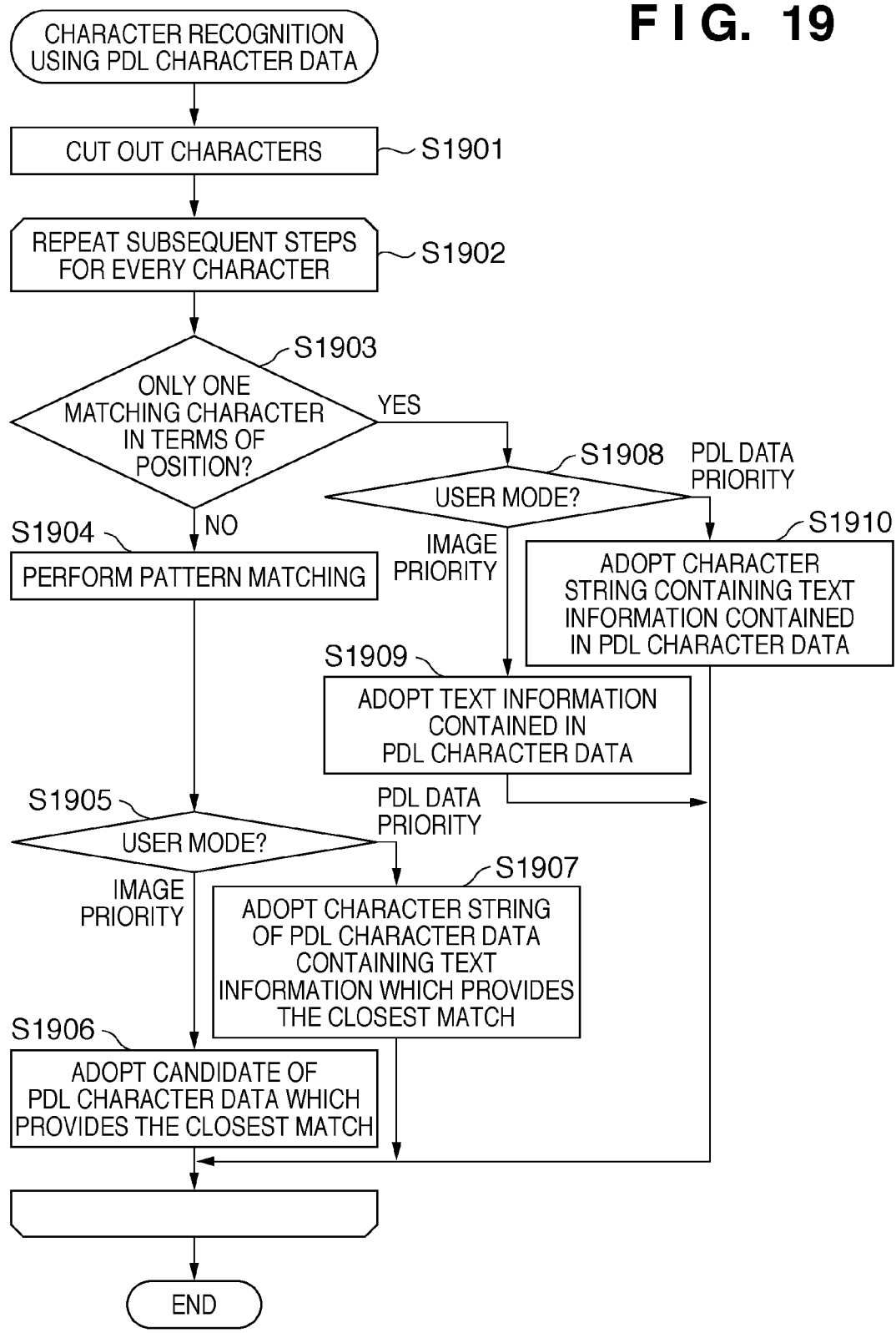
FIG. 19 is a flowchart showing details of a character recognition process using PDL character data according to a third embodiment.

FIG. 19 is a flowchart showing details of a character recognition process using PDL character data according to the third embodiment. In S1901, the metadata generating process 306 cuts out characters from the targeted character region. To cut out characters, the metadata generating process 306 determines whether the characters are written vertically or horizontally, cuts a line in the appropriate direction, and finally cuts out the characters.

The determination as to whether the characters are written vertically or horizontally is made based on distribution of vertical and horizontal projections (or histograms) produced from the bits which represent character objects out of the attribute bits in the region. For example, if variance of the horizontal projection is larger, it is determined that the characters are written horizontally in the region. On the other hand, if variance of the vertical projection is larger, it is determined that the characters are written vertically in the region. To cut out the characters, in the case of horizontal writing, an appropriate line is cut out using the horizontal projection and then the characters are cut out based on the vertical projection of the line. In the case of a region with vertical writing, the horizontal and vertical directions are interchanged.

Next, steps S1902 to S1906 are carried out in sequence for each of the characters cut out. The characters are processed rightward beginning with the upper left character in the case of horizontal writing, or processed downward beginning with the upper right character in the case of vertical writing.

In S1903, the metadata generating process 306 determines a bounding box for the targeted character which has been cut out, compares the bounding box with bounding box information about each character in the PDL character data, and searches for any matching character. If it is found as a result of the search that there are two or more matching characters, the metadata generating process 306 goes to S1904. If there is only one matching character, the metadata generating process 306 goes to S1908. The bounding box information does not need to match exactly. For example, the bounding box for the targeted character can be regarded to match the bounding box for a character in the PDL character data if the bounding boxes overlap 95%.

In S1904, the metadata generating process 306 selects multiple characters with matching bounding boxes from the PDL character data as candidates and performs pattern matching between the targeted character and the candidates using bitmaps. In S1905, the metadata generating process 306 switches between steps according to a user mode specified by the user in advance. Available user modes include image priority mode and print data priority mode. If the user mode is Image Priority, the metadata generating process 306 goes to S1906. If the user mode is PDL Data Priority, the metadata generating process 306 goes to S1907.

In S1906, the metadata generating process 306 selects the candidate which provides the closest match in S1904 and adds its text information as a recognition result of the targeted character. In S1907, the metadata generating process 306 selects the candidate which provides the closest match in S1904 and adds the text information of the entire character string containing the selected character as a recognition result.

The Strings-ID information of the character string adopted once is stored in the RAM 206 and a character string to be adopted is not added as a recognition result if its Strings-ID information is already stored.

On the other hand, in S1908 the metadata generating process 306 switches between steps according to the user mode specified by the user in advance, as in the case of S1905. If the user mode is Image Priority, the metadata generating process 306 goes to S1909. If the user mode is PDL Data Priority, the metadata generating process 306 goes to S1910.

In S1909, the metadata generating process 306 adopts and adds the text information of the character which, being contained in the PDL character data, matches the bounding box of the targeted character, as a recognition result of the targeted character. In S1910, the metadata generating process 306 adopts and adds the entire character string containing the character which, being contained in the PDL character data, matches the bounding box of the targeted character, as a recognition result of the targeted character. Again, the Strings-ID information of the character string adopted once is stored in the RAM 206 and a character string to be adopted is not added as a recognition result if its Strings-ID information is already stored.

Incidentally, the character string extracted as a result of character recognition using the PDL character data contains text information of characters arranged in the order in which the characters are recognized.

According to the third embodiment, the user can change metadata generation conditions used in a search. That is, when it is desired to target a search at only the characters contained in an output image, the user selects the Image Priority mode. On the other hand, when it is desired to target a search at an entire character string even though only a part of a drawing object specified as a character string in PDL data is drawn on an output image, the user selects the PDL Data Priority mode.

The present invention may be applied either to a system consisting of two or more apparatus (e.g., a host computer, interface devices, a reader, a printer, and the like) or to equipment consisting of a single apparatus (e.g., a copier, a facsimile machine, or the like).

The object of the present invention can also be achieved by a recording medium containing program code of a software that implements the functions of the above embodiments: the recording medium is supplied to a system or apparatus, whose computer (a CPU or MPU) then reads the program code out of the recording medium and executes it.

In that case, the program code itself read out of the computer-readable recording medium (storage medium) will implement the functions of the above embodiments, and the recording medium which stores the program code will constitute the present invention.

Examples of the recording medium used to supply the program code include, for example, a flexible disk, hard disk, optical disk, magneto-optical disk, CD-ROM, CD-R, magnetic tape, non-volatile memory card, and ROM.

Also, the functions of the above embodiments can be implemented not only by the program code read out and executed by the computer, but also by part or all of the actual processing executed according to instructions from the program code by an OS (operating system) running on the computer.

Furthermore, the functions of the above embodiments can also be implemented by part or all of the actual processing executed by a CPU or the like contained in a function expansion card inserted in the computer or a function expansion unit connected to the computer if the processing is performed according to instructions from the program code that has been read out of the recording medium and written into memory on the function expansion card or unit.

Since the present invention determines character data used for metadata based on a raster image obtained by rasterizing print data and character data extracted from the print data, the present invention can determine more accurate metadata.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-327984, filed Dec. 19, 2007, and 2008-309998, filed Dec. 4, 2008, which is hereby incorporated by reference herein in their entirety.

What is claimed is:

1. A metadata determination method comprising:
an extraction step of extracting character data from print data;
a rasterizing step of rasterizing the print data into a raster image;
a region dividing step of dividing the raster image into a character region and a non-character region; and
a determination step of determining character data used for metadata based on the raster image of the character region and the character data extracted in said extraction step and drawn at approximately the same position as the character region,
wherein if there is a plurality of character data items extracted in said extraction step and drawn at approximately the same position as a character image cut out from the raster image of the character region, said determination step determines the character data used for the metadata by pattern matching between the character image and the plurality of character data items.

2. The metadata determination method according to claim 1, wherein if there is one character data item extracted in said extraction step and drawn at approximately the same position as a character image cut out from the raster image of the character region, said determination step uses the character data item for the metadata.

3. The metadata determination method according to claim 1, wherein if there is a plurality of character data items extracted in said extraction step and drawn at approximately the same position as a character image cut out from the raster image of the character region, said determination step determines a character data item which matches the character image by pattern matching and uses character strings of the extracted character data containing the determined character data item for the metadata.

4. The metadata determination method according to claim 1, further comprising a selection step of allowing a user to select between an image priority mode and print data priority mode in advance, wherein
when the image priority mode is selected, said determination step uses a character data item which matches the character image as the metadata, and when the print data priority mode is selected, said determination step uses the entire character data extracted in said extraction step and containing the character data item which matches the character image for the metadata.

5. A metadata determination method, comprising:
a selection step of allowing a user to select between an image priority mode and print data priority mode in advance;
an extraction step of extracting character data from print data;
a rasterizing step of rasterizing the print data into a raster image;
a region dividing step of dividing the raster image into a character region and a non-character region; and
a determination step of determining character data used for metadata based on the raster image of the character region and the character data extracted in said extraction step and drawn at approximately the same position as the character region, wherein
if there is one character data item extracted in said extraction step and drawn at approximately the same position as a character image cut out from the raster image of the character region, when the image priority mode is selected, said determination step uses the character data item drawn at approximately the same position as the character image as the metadata, and when the print data priority mode is selected, said determination step uses the entire character data extracted in said extraction step and containing the character data item drawn at approximately the same position as the character image for the metadata.

6. The metadata determination method according to claim 1, wherein the print data is PDL data.

7. The metadata determination method according to claim 1, wherein:
said rasterizing step obtains the raster image and attribute information about pixels of the raster image by rasterizing the print data; and
said region dividing step divides the raster image into the character region and the non-character region; based on the attribute information.

8. The metadata determination method according to claim 1, further comprising an adding step of adding information to the metadata by performing a character recognition process on the non-character region.

9. The metadata determination method according to claim 1, further comprising a searching step of performing a search process using a specified search keyword and the metadata.

10. An image forming apparatus comprising:
an extraction unit that extracts character data from print data;
a rasterizing unit that rasterizes the print data into a raster image;
a region dividing unit that divides the raster image into a character region and a non-character region; and
a determination unit that determines character data used for metadata based on the raster image of the character region and the character data extracted by said extraction unit and drawn at approximately the same position as the character region,
wherein if there is a plurality of character data items extracted by said extraction unit and drawn at approximately the same position as a character image cut out from the raster image of the character region, said determination unit determines the character data used for the metadata by pattern matching between the character image and the plurality of character data items.

11. A non-transitory computer-readable recording medium containing a program executable by a computer to implement a metadata determination method, the method comprising:
a selection step of allowing a user to select between an image priority mode and print data priority mode in advance;
an extraction step of extracting character data from print data;
a rasterizing step of rasterizing the print data into a raster image;
a region dividing step of dividing the raster image into a character region and a non-character region; and
a determination step of determining character data used for metadata based on the raster image of the character region and the character data extracted in said extraction step and drawn at approximately the same position as the character region, wherein
if there is one character data item extracted in said extraction step and drawn at approximately the same position as a character image cut out from the raster image of the character region, when the image priority mode is selected, said determination step uses the character data item drawn at approximately the same position as the character image as the metadata, and when the print data priority mode is selected, said determination step uses the entire character data extracted in said extraction step and containing the character data item drawn at approximately the same position as the character image for the metadata.

12. An image forming apparatus comprising:
a selection unit that allows a user to select between an image priority mode and print data priority mode in advance;
an extraction unit that extracts character data from print data;
a rasterizing unit that rasterizes the print data into a raster image;
a region dividing unit that divides the raster image into a character region and a non-character region; and
a determination unit that determines character data used for metadata based on the raster image of the character region and the character data extracted by said extraction unit and drawn at approximately the same position as the character region,
wherein if there is one character data item extracted by said extraction unit and drawn at approximately the same position as a character image cut out from the raster image of the character region, when the image priority mode is selected, said determination unit uses the character data item drawn at approximately the same position as the character image as the metadata, and when the print data priority mode is selected, said determination unit uses the entire character data extracted by said extraction unit and containing the character data item drawn at approximately the same position as the character image for the metadata.

13. A non-transitory computer-readable recording medium containing a program executable by a computer to implement a metadata determination method, the method comprising:
a selection step of allowing a user to select between an image priority mode and print data priority mode in advance;
an extraction step of extracting character data from print data;
a rasterizing step of rasterizing the print data into a raster image;
a region dividing step of dividing the raster image into a character region and a non-character region; and
a determination step of determining character data used for metadata based on the raster image of the character region and the character data extracted in said extraction step and drawn at approximately the same position as the character region, wherein
if there is one character data item extracted in said extraction step and drawn at approximately the same position as a character image cut out from the raster image of the character region, when the image priority mode is selected, said determination step uses the character data item drawn at approximately the same position as the character image as the metadata, and when the print data priority mode is selected, said determination step uses the entire character data extracted in said extraction step and containing the character data item drawn at approximately the same position as the character image for the metadata.

* * * * *